United States Patent
Gladnick et al.

(10) Patent No.: US 12,458,501 B1
(45) Date of Patent: Nov. 4, 2025

(54) DE-ESCALATION SYSTEMS AND METHODS INCLUDING HIP CONES FOR TOTAL HIP ARTHROPLASTY (THA) SUCH AS REVISION TOTAL HIP ARTHROPLASTY

(71) Applicants: Brian P. Gladnick, Dallas, TX (US); Alexander Sah, Fremont, CA (US)

(72) Inventors: Brian P. Gladnick, Dallas, TX (US); Alexander Sah, Fremont, CA (US)

( * ) Notice: Subject to any disclaimer, the term of this patent is extended or adjusted under 35 U.S.C. 154(b) by 0 days.

(21) Appl. No.: 19/086,299

(22) Filed: Mar. 21, 2025

(51) Int. Cl.
*A61F 2/36* (2006.01)
*A61F 2/30* (2006.01)

(52) U.S. Cl.
CPC ........ *A61F 2/3609* (2013.01); *A61F 2/30771* (2013.01); *A61F 2002/30331* (2013.01); *A61F 2002/3069* (2013.01); *A61F 2002/3092* (2013.01); *A61F 2002/3093* (2013.01); *A61F 2002/3613* (2013.01); *A61F 2002/3623* (2013.01)

(58) Field of Classification Search
CPC .............. A61F 2/30724; A61F 2/30723; A61F 2002/30606
See application file for complete search history.

(56) References Cited

U.S. PATENT DOCUMENTS

| | | | | |
|---|---|---|---|---|
| 5,035,714 A | * | 7/1991 | Willert | A61F 2/30734 623/23.62 |
| 5,755,720 A | * | 5/1998 | Mikhail | A61F 2/30734 606/92 |
| 5,755,793 A | * | 5/1998 | Smith | A61F 2/30734 623/23.48 |
| 5,766,262 A | * | 6/1998 | Mikhail | A61F 2/30734 623/23.25 |
| 5,910,172 A | * | 6/1999 | Penenberg | A61F 2/4601 606/86 R |
| 5,954,771 A | * | 9/1999 | Richelsoph | A61F 2/36 623/23.15 |
| 5,976,188 A | * | 11/1999 | Dextradeur | A61B 17/8802 623/23.23 |
| 5,984,968 A | * | 11/1999 | Park | A61B 17/8802 623/16.11 |
| 5,997,581 A | * | 12/1999 | Khalili | A61F 2/30724 606/92 |

(Continued)

OTHER PUBLICATIONS

S-ROM Modular Hip System: Design Rationale, 2005, 12 pages, DePuy Orthopaedics, Inc., a Johnson & Johnson company, USA.

(Continued)

*Primary Examiner* — Alvin J Stewart
(74) *Attorney, Agent, or Firm* — HAYNES AND BOONE, LLP

(57) ABSTRACT

De-escalation revision systems and methods for total hip arthroplasty (THA), or total hip replacement, according to which a hip cone is installed in a femur, and a femoral stem is installed through the hip cone via bone cement, unitizing the femoral stem to the hip cone. The hip cone experiences mechanical fixation due to the bone cement, as well as long-term biologic fixation due to, for example, bony ingrowth into the hip cone. The systems and methods are suitable for complex primary, conversion, or revision total hip replacement, and are suitable from any approach such as, for example, direct anterior (DA), posterior, or lateral approaches.

34 Claims, 15 Drawing Sheets

(56) References Cited

U.S. PATENT DOCUMENTS

| | | | | |
|---|---|---|---|---|
| 6,123,730 | A * | 9/2000 | Ling | A61F 2/30724 623/23.25 |
| 6,139,584 | A * | 10/2000 | Ochoa | A61B 17/1668 623/23.46 |
| 6,245,113 | B1 * | 6/2001 | Revie | A61F 2/30724 623/23.46 |
| 6,344,060 | B1 * | 2/2002 | Schmotzer | A61F 2/30724 623/23.22 |
| 6,500,209 | B1 * | 12/2002 | Kolb | A61F 2/30724 623/23.23 |
| 6,981,991 | B2 * | 1/2006 | Ferree | A61F 2/30734 623/23.46 |
| 9,149,282 | B2 * | 10/2015 | Servidio | A61F 2/389 |
| 9,517,138 | B2 | 12/2016 | Zubok et al. | |
| 10,433,964 | B2 | 10/2019 | Wainscott et al. | |
| 11,020,232 | B2 * | 6/2021 | Armacost | A61F 2/3607 |
| 11,213,399 | B2 * | 1/2022 | Link | A61F 2/367 |
| 11,565,021 | B1 * | 1/2023 | Davies | A61L 27/56 |
| 12,121,446 | B1 * | 10/2024 | Henderson | A61F 2/3609 |
| 12,220,317 | B2 * | 2/2025 | Librot | A61F 2/30771 |
| 12,274,455 | B2 * | 4/2025 | Collazo | A61F 2/30734 |
| 2002/0111692 | A1 * | 8/2002 | Ralph | A61F 2/30734 623/23.23 |
| 2003/0065397 | A1 * | 4/2003 | Hanssen | A61F 2/34 623/23.23 |
| 2003/0074080 | A1 * | 4/2003 | Murray | A61F 2/4637 623/23.23 |
| 2003/0187513 | A1 * | 10/2003 | Durniak | A61B 17/8802 623/23.62 |
| 2004/0117023 | A1 * | 6/2004 | Gerbec | A61F 2/38 623/23.25 |
| 2005/0143837 | A1 * | 6/2005 | Ferree | A61B 17/164 623/23.25 |
| 2009/0306673 | A1 * | 12/2009 | Buma | A61F 2/468 606/86 R |
| 2012/0010720 | A1 * | 1/2012 | Dickerson | A61F 2/3607 623/22.42 |
| 2013/0018482 | A1 * | 1/2013 | Meridew | A61F 2/30734 623/23.46 |
| 2014/0039637 | A1 * | 2/2014 | Dickerson | A61F 2/3607 623/22.4 |
| 2016/0184103 | A1 * | 6/2016 | Fonte | A61L 27/56 623/23.5 |
| 2023/0255777 | A1 * | 8/2023 | Vogt | A61F 2/30771 623/18.11 |
| 2025/0032273 | A1 * | 1/2025 | Webb | A61F 2/3859 |

OTHER PUBLICATIONS

S-ROM Modular Hip System: Surgical Technique, Joint Reconstruction, 2020, 24 pages, DePuy Synthes, a Johnson & Johnson company, EMEA.

Spitzer, The S-ROM Cementless Femoral Stem: History and Literature Review, Healio.com, Sep. 1, 2005, 11 pages, USA.

S-ROM Modular Hip System: Surgical Technique, 2018, 24 pages, DePuy Synthes, a Johnson & Johnson company, USA.

* cited by examiner

DE-ESCALATION SYSTEMS AND METHODS INCLUDING HIP CONES FOR TOTAL HIP ARTHROPLASTY (THA) SUCH AS REVISION TOTAL HIP ARTHROPLASTY

TECHNICAL FIELD

The present disclosure relates generally to total hip replacement, or total hip arthroplasty (THA); more particularly, the present disclosure relates to de-escalation systems and methods for total hip arthroplasty (THA).

BACKGROUND

Total hip replacement, or total hip arthroplasty (THA), is a procedure by which a damaged and/or arthritic human hip joint is replaced with prosthetic components, which form a hip implant or artificial hip joint; such prosthetic components together operate like a human hip joint. In some cases, after the total hip replacement, the hip implant or artificial hip joint may wear out, fail, become damaged, or experience other complications. To address these complications, a second procedure known as hip revision surgery, or revision total hip arthroplasty (THA), may be carried out with respect to the femur (thighbone) with which the to-be-replaced hip implant or artificial hip joint is engaged. In many cases, femoral revision techniques require surgeons to "escalate" the level of invasiveness in the femur. Escalation examples include longer constructs (artificial structures or prosthetic components) within the femur, more bone removal from the femur, and diaphyseal engagement; these examples require challenging reconstructions, which necessitate longer surgery times, more exposure, and more technically demanding steps and procedures, especially with direct anterior (DA) approaches. These escalation examples also increase the risk of infection, dislocation, and fracture. Alarmingly, the level of invasiveness may be escalated to such a degree that, for example: the femur includes an un-resectable construct, that is, an artificial structure or prosthetic component that is unable able to be surgically removed from the femur without significantly and/or permanently damaging the bone; an endoprosthesis is required; the patient experiences chronic disability; or the patient experiences poorer functional outcomes. Therefore, what is needed are techniques that "de-escalate" invasiveness, such as de-escalation systems, components, methods, steps, etc. for total hip arthroplasty (THA), including complex primary, conversion, or revision total hip replacement, from different approaches such as, for example, direct anterior (DA), posterior, or lateral approaches.

DETAILED DESCRIPTION

Figure 1:
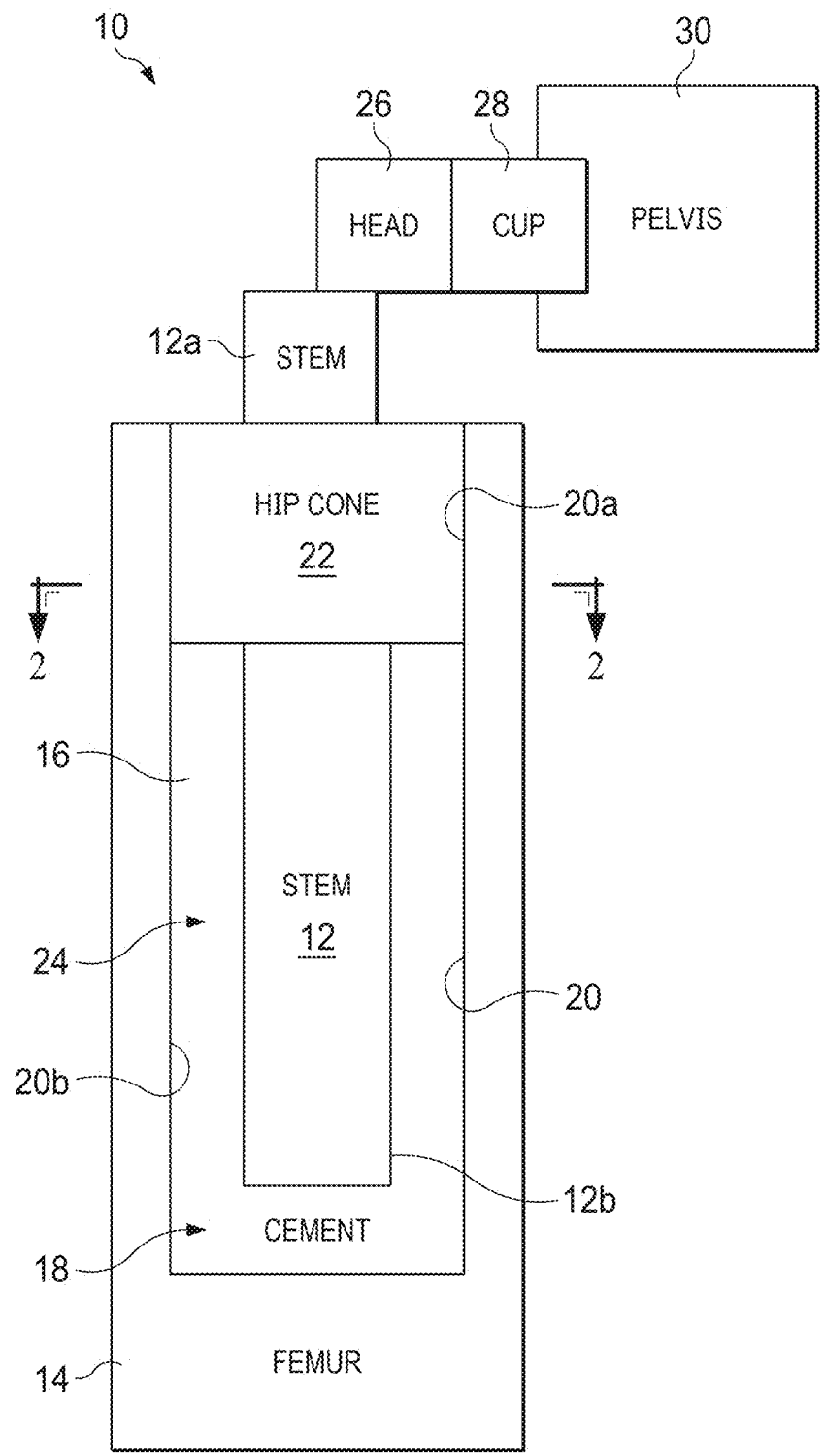
FIG. 1 is a diagrammatic illustration of a de-escalation system for total hip arthroplasty (THA), according to one or more embodiments of the present disclosure.

The following disclosure provides different embodiments or examples of systems, components, arrangements, devices, methods, steps, etc. Specific examples of systems, components, arrangements, devices, methods, and steps are described below. These specific examples are merely examples and are not intended to be limiting. In addition, the present disclosure may repeat reference numerals and/or letters in various examples. This repetition is for the purpose of clarity and does not in and of itself dictate a relationship between the various embodiments and/or configurations discussed.

Figure 2:
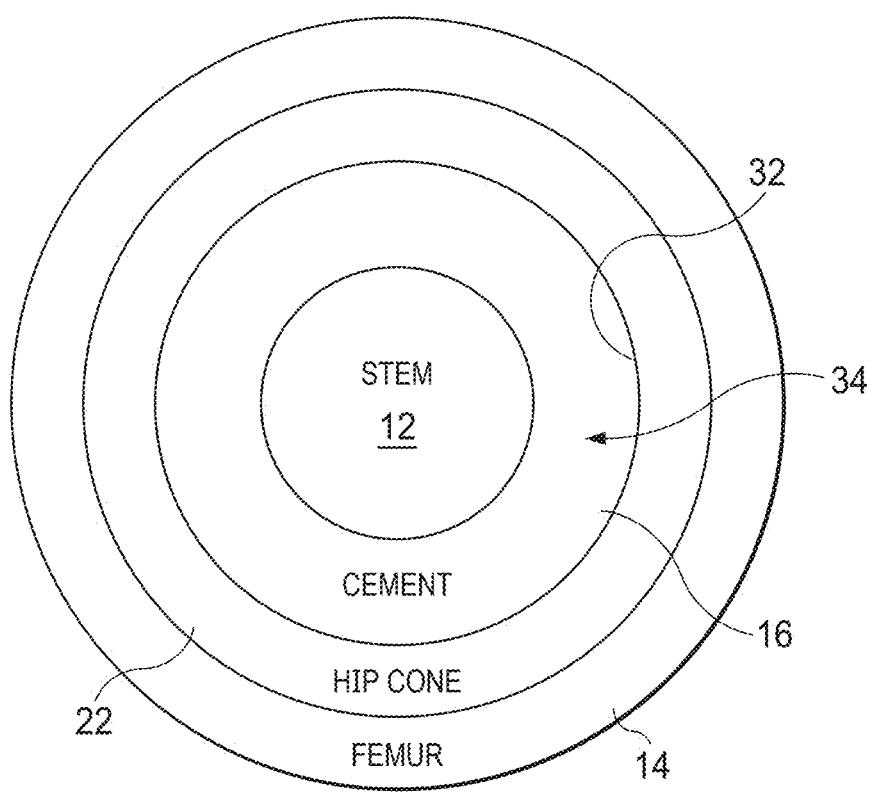
FIG. 2 is a sectional diagrammatic view of a portion of the de-escalation revision system of FIG. 1, taken along line 2-2 of FIG. 1 and according to one or more embodiments of the present disclosure.

In one or more embodiments, as illustrated in FIGS. 1 and 2, a de-escalation system for total hip arthroplasty (THA) is generally referred to by the reference numeral 10. In several example embodiments, the system 10 and/or component(s) thereof are suitable from any approach such as, for example, direct anterior (DA), posterior, or lateral approaches. In several example embodiments, the system 10 and/or component(s) thereof are suitable for complex primary, conversion, or revision total hip replacement. As shown in FIGS. 1 and 2, the system 10 includes a femoral stem 12 extending within a femur 14 and surrounded by bone cement 16. An internal region 18 is defined in the femur 14 and filled with the bone cement 16. The internal region 18 defines interior surface(s) 20 of the femur 14. The femur 14 is the thighbone of a human leg. A hip cone 22 is disposed within the internal region 18, and engages a portion 20*a* of the interior surface(s) 20 of the femur 14. The stem 12 extends through the hip cone 22 and into the portion of the internal region 18 below the hip cone 22, so that respective portions of the stem 12 extend within, and outside of, the hip cone 22.

As viewed in FIG. 1, a proximal end portion 12*a* of the stem 12 is located outside of, and above, the hip cone 22. A distal end portion 12*b* of the stem 12 is located outside of, and below, the hip cone 22. An annular-type region 24 is defined between the stem 12 and a portion 20*b* of the interior surface(s) 20 of the femur 14. The annular-type region 24 is part of the internal region 18 defined in the femur 14. The annular-type region 24 is filled with the bone cement 16. As shown in FIG. 1, a femoral head 26 is operably coupled to the proximal end portion 12*a* of the stem 12. An acetabular cup 28 is engaged with the head 26. The cup 28 is also operably coupled to a pelvis 30, which belongs to the human to which the femur 14 belongs.

As shown in FIG. 2, the hip cone 22 defines interior surface(s) 32. An annular-type region 34 is defined between the stem 12 and the interior surface(s) 32 of the hip cone 22. The annular-type region 34 is part of an internal region defined by the hip cone 22 and partially taken up by the stem 12. The annular-type region 34 is also part of the internal region 18 defined in the femur 14, and is in fluid communication with the portion of the internal region 18 below the hip cone 22, including the annular-type region 24. The annular-type region 34 is filled with the bone cement 16.

Figure 3:
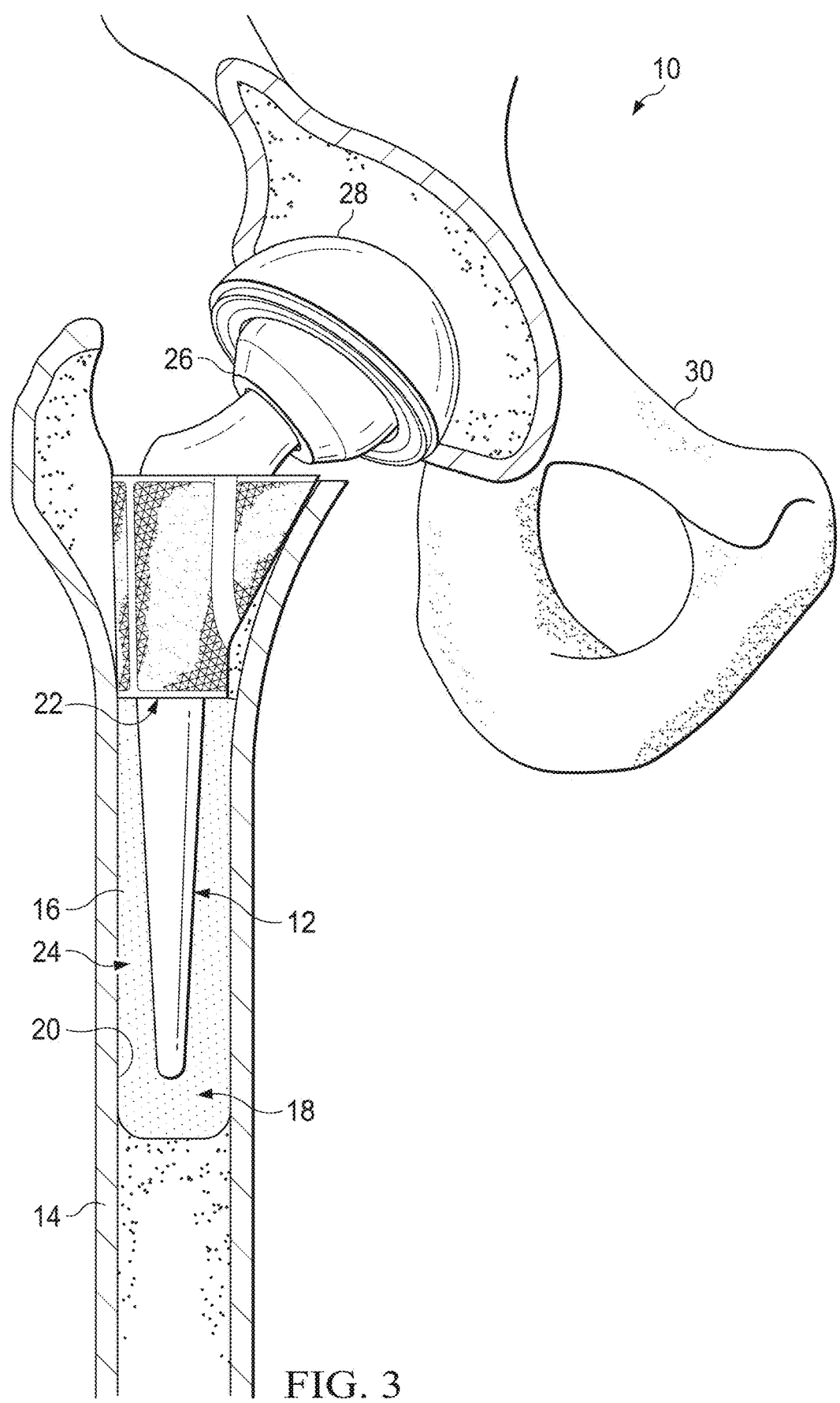
FIG. 3 is partial sectional/partial elevational/partial diagrammatic view of an example embodiment of the de-escalation revision system of FIG. 1, the system including a femur, a femoral stem, hip cone, a femoral head, an acetabular cup, and pelvis, according to one or more embodiments of the present disclosure.

In one or more embodiments, as illustrated in FIG. 3 with continuing reference to FIGS. 1 and 2, the system 10 includes example embodiments of the stem 12, the femur 14, the bone cement 16, the internal region 18, the interior surface(s) 20, the hip cone 22, the annular-type region 24, the head 26, the cup 28, and the pelvis 30.

Figure 4:
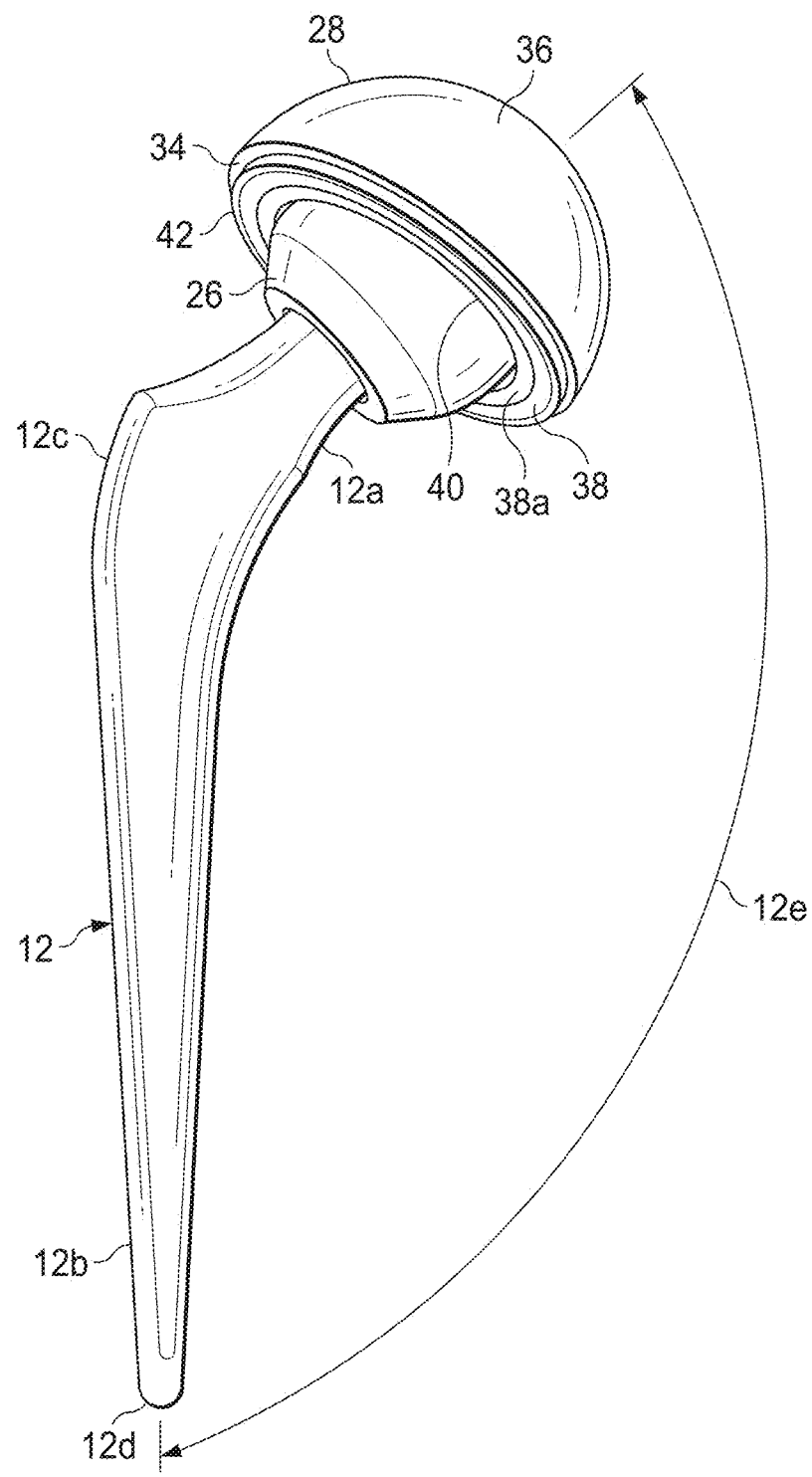
FIG. 4 is a perspective view of the stem, head, and cup of FIG. 3, according to one or more embodiments of the present disclosure.

In one or more embodiments, as illustrated in FIG. 4 with continuing reference to FIGS. 1, 2, and 3, the cup 28 is an acetabular cup or component, which includes an acetabular shell 34, which defines an outside hemispherical surface 36. In several example, embodiments, the outside hemispherical surface 36 is configured to promote biologic fixation with the pelvis 30. For example, in several embodiments, the outside hemispherical surface 36 includes one or more coatings, which one or more coatings are configured to promote biologic fixation with the pelvis 30; in several example embodiments, such one or more outside coatings are porous and have predetermined porosity (void fraction) and/or pore size(s). In several example embodiments, the outside hemispherical surface 36 of the shell includes one or more bioactive coatings. In several example embodiments, the outside hemispherical surface 36 of the shell 34 includes one or more bioactive coatings to, for example, promote biologic fixation with the pelvis 30. In several example embodiments, a plurality of holes or pores are formed in the outside hemispherical surface 36 of the shell 34. In several example embodiments, a plurality of holes and/or pores are formed through, or at least into, the outside hemispherical surface 36 of the shell 34, and the surface 36 includes one or more coatings to promote biologic fixation. In several example embodiments, the shell 34 is composed of metal(s) only, plastic(s) only, one or more combinations of metal(s), one or more combinations of plastic(s), one or more combinations of metal(s) and plastic(s), other material(s), or combination(s) thereof.

An acetabular liner 38 is disposed within the shell 34. A semi-spherical internal socket region 40 is defined by the liner 38. In several example embodiments, the outside shape of the liner 38 (not shown) matches the shape of the shell 34, with the liner 38 nesting within the shell 34. In several example embodiments, the liner 38 includes a plurality of nesting liners such as, for example and as shown in FIG. 4, an inner liner 38*a* and an outer liner (not shown) within which the inner liner 38*a* nests. In some embodiments, a locking ring 42 may lock together, in whole or in part, the shell 34 and the liner 38, but in other embodiments the locking ring 42 is omitted. In several example embodiments, the liner 38 or a component thereof, such as the inner liner 38*a*, is/are composed of polyethylene, plastic, metal, ceramic, ceramicized metal, oxinium (from Smith & Nephew), etc., or combination(s) thereof. In several example embodiments, the acetabular liner 38 and the locking ring 42 are omitted from the cup 28, and the cup 28 includes the shell 34, which engages the head 26 directly rather the indirectly via the liner 38. In several example embodiments, as noted above, the locking ring 42 is omitted from the cup 28, and the liner 38 is connected to the shell 34 via connection component(s) and/or connection technique(s) other than the locking ring 42; in one or embodiments, the liner 38 is locked into the shell 34 via a tapered fit.

In one or more embodiments, the head 26 is a femoral head and is generally ball-shaped or spherical in shape. The head 26 extends into the internal socket region 40 of the liner 38 of the cup 28, thereby forming a ball-and-socket connection between the head 26 and the cup 28. The head 26 includes an opening 26*a* formed therein and into which the proximal end portion 12*a* of the stem 12 extends, thereby connecting the stem 12 to the head 26. In several example embodiments, the head 26 is composed of metal(s) only, plastic(s) only, one or more combinations of metal(s), one or more combinations of plastic(s), one or more combinations of metal(s) and plastic(s), other material(s), ceramic, oxinium (from Smith & Nephew), or combination(s) thereof. In several example embodiments, the head 26 is a dual mobility head, including an outer plastic portion and a metal or ceramic inner portion.

As shown in FIG. 4, in one or more embodiments, the stem 12 includes a bending, or transition, portion 12*c* with which the proximal end portion 12*a* of the stem 12 adjoins. The distal end portion 12*b* of the stem 12 also adjoins the transition portion 12*c*, with the distal end portion 12*b* extending vertically downward from the transition portion 12*c*. As shown in FIG. 4, the distal end portion 12*b* tapers downward, tapering as it extends downward to a tapered end 12*d* of the stem 12. In several example embodiments, the distal end portion 12*b* is not tapered and the tapered end 12*d* is omitted from the stem 12. Instead, in several example embodiments, the distal end portion 12*b* has a generally consistent cross-section throughout the length of the distal end portion 12*b*; for example, in one or more embodiments, the distal end portion 12*b* is in the shape of a cylinder and thus has a consistent circular cross-section throughout the length of the distal end portion 12*b*. In several example embodiments, the distal end portion 12*b* is not tapered and/or has one or more other shapes/cross-sections of any variety. In several example embodiments, the tapered end 12*d* is not tapered and/or has one or more other shapes/cross-sections of any variety.

The transition portion 12*c* is configured so that the proximal end portion 12*a* is angled with respect to the distal end portion 12*b* of the stem 12. In several example embodiments, an obtuse angle 12*e* is defined between the proximal end portion 12*a* extending within the head 26, and the extension of the distal end portion 12b to the tapered end 12d, with the vertex of such the angle 12e being at or near the transition portion 12c.

In several example embodiments, the portions 12a, 12b, and 12c of the stem 12 are integrally formed. In several example embodiments, the stem 12 is an integrally formed, monolithic structure. In several example embodiments, the stem 12 is a smooth and polished tapered stem ("taper slip design"). In several example embodiments, the stem 12 is textured or coated with material(s) that enhance the ability of the stem 12 to bind to cement ("i-beam design"). In several example embodiments, the stem 12 may be smooth or have a variable topography; for example, the stem 12 may have flutes and/or ridges. In several example embodiments, the stem 12 may or may not have porous coating. In several example embodiments, the stem 12 does not include any porous coating. In several example embodiments, the stem 12 includes a porous coating over one or more portions, or all, of the outside surface of the stem 12, to promote biologic fixation. In several example embodiments, the stem 12 includes a porous surface at one or more portions, or all, of the outside surface of the stem 12, to promote biologic fixation. In several example embodiments, the stem 12 includes a porous surface at one or more portions, or all, of the outside surface of the stem 12, and a porous coating over one or more portions, or all, of the outside surface of the stem 12, to promote biologic fixation. In several example embodiments, the stem 12 is composed of metal(s) only, plastic(s) only, one or more combinations of metal(s), one or more combinations of plastic(s), one or more combinations of metal(s) and plastic(s), other material(s), or combination(s) thereof.

In one or more embodiments, as illustrated in FIGS. 5, 6, 7, 8, and 9 with continuing reference to FIGS. 1, 2, 3, and 4, the hip cone 22 includes a body including a main portion 44 and a spout portion 46 adjoined thereto. The body of the hip cone 22 defines an internal region 48, the shape of which matches, tracks, or corresponds to the overall outside shape of the hip cone 22, including the overall outside shape of the adjoined portions 44 and 46 of the hip cone 22, as shown in FIGS. 5, 6, 7, 8, and 9.

More particularly, the main portion 44 includes an upper end portion 44a and a lower end portion 44b opposite thereto. An intermediate sleeve portion 44c of the main portion extends downward from the upper end portion 44a to the lower end portion 44b; as shown in FIG. 3, at least a portion of the vertical downward directional extension of the distal end portion 12b of the stem 12 is generally coaxial with the downward directional extension of the intermediate sleeve portion 44c of the main portion. A main portion 48a of the internal region 48 of the hip cone 22 is defined by the main portion 44. In several example embodiments, the interior surfaces of the main portion are tapered, narrowing from the upper portion of the main portion to the lower portion of the main portion, as best viewed in FIG. 6; in such example embodiments, respective internal diameters of the main portion defined by the main portion 48a of the internal region 48 decrease from the upper to the lower portions; in several example embodiments, the main portion 44 is not tapered as viewed in FIG. 6 and instead the foregoing diameters are constant. In several example embodiments, the main portion 44 has a cylindrical shape, a circular shape, an ovoid shape, an oblong shape, or an irregular shape. In several example embodiments, the main portion 48a of the internal region 48 has a cylindrical shape, a circular shape, an ovoid shape, an oblong shape, or an irregular shape. In several example embodiments, the overall shape of the internal region 48 is configured to optimize the inside volume of the hip cone 22, to accommodate as much space as possible for different sizes and shapes of different embodiments of the stem 12.

Figure 5:
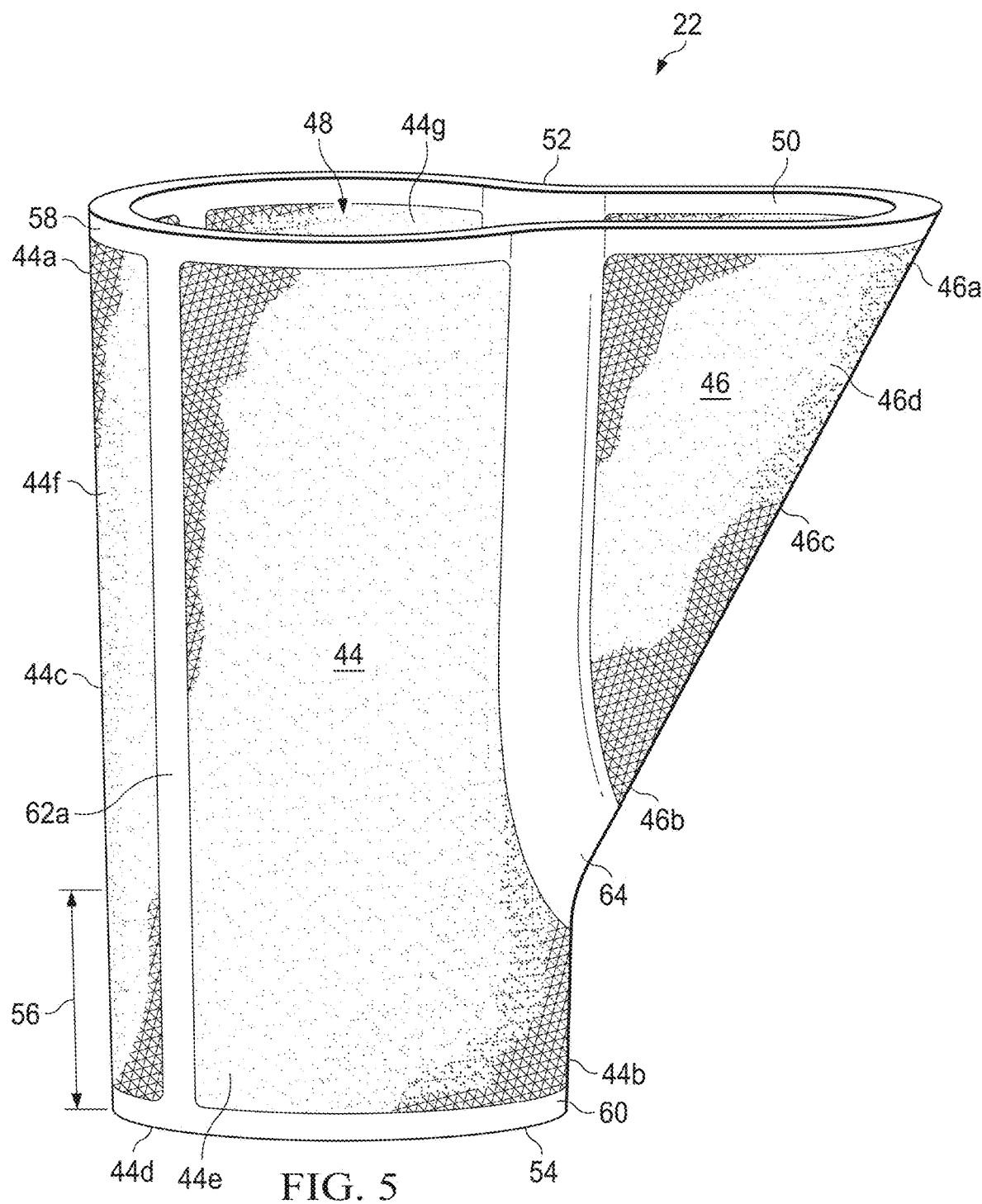
FIG. 5 is a perspective view of the hip cone of FIG. 3, according to one or more embodiments of the present disclosure.
Figure 6:
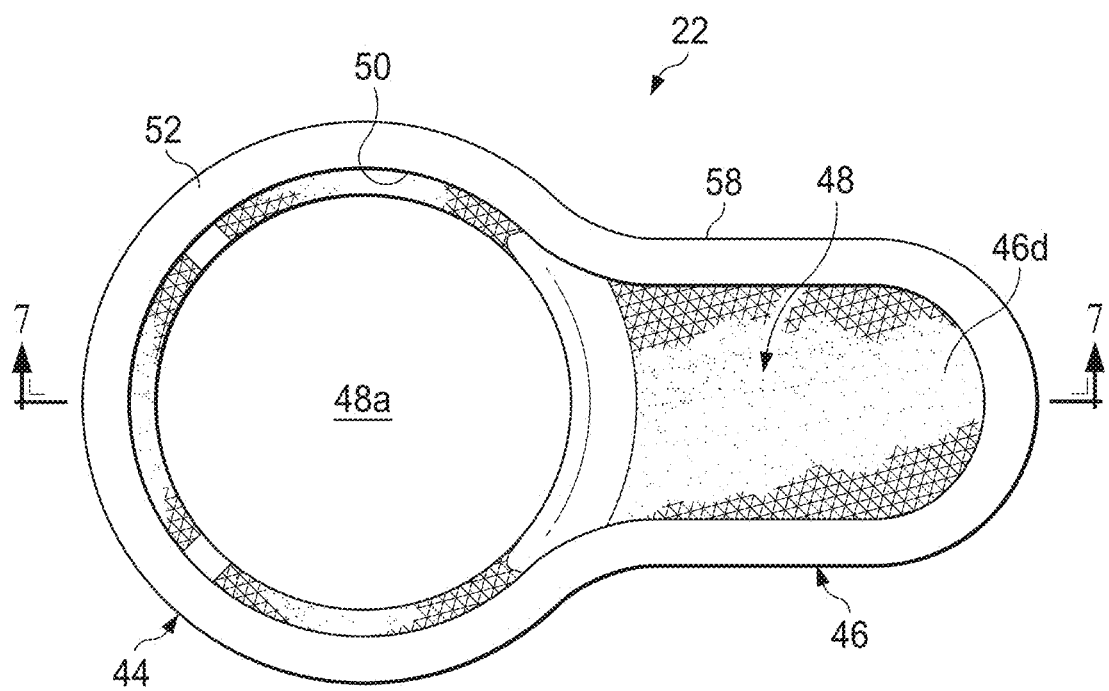
FIG. 6 is a top view of the hip cone of FIGS. 3 and 5, according to one or more embodiments of the present disclosure.
Figure 7:
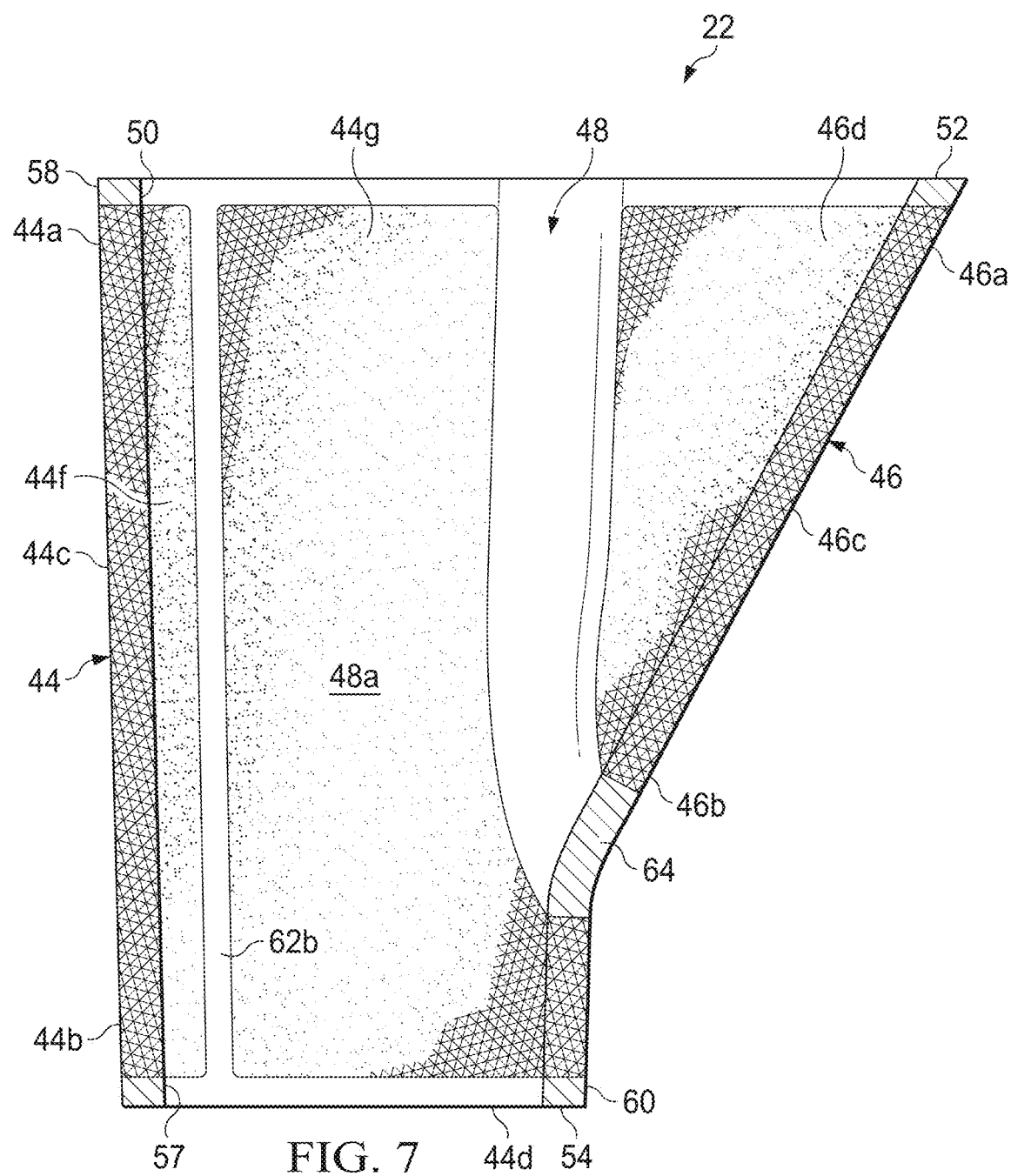
FIG. 7 is a sectional view of the hip cone of FIGS. 3, 5, and 6, taken along line 7-7 of FIG. 6 and according to one or more embodiments of the present disclosure.
Figure 8:
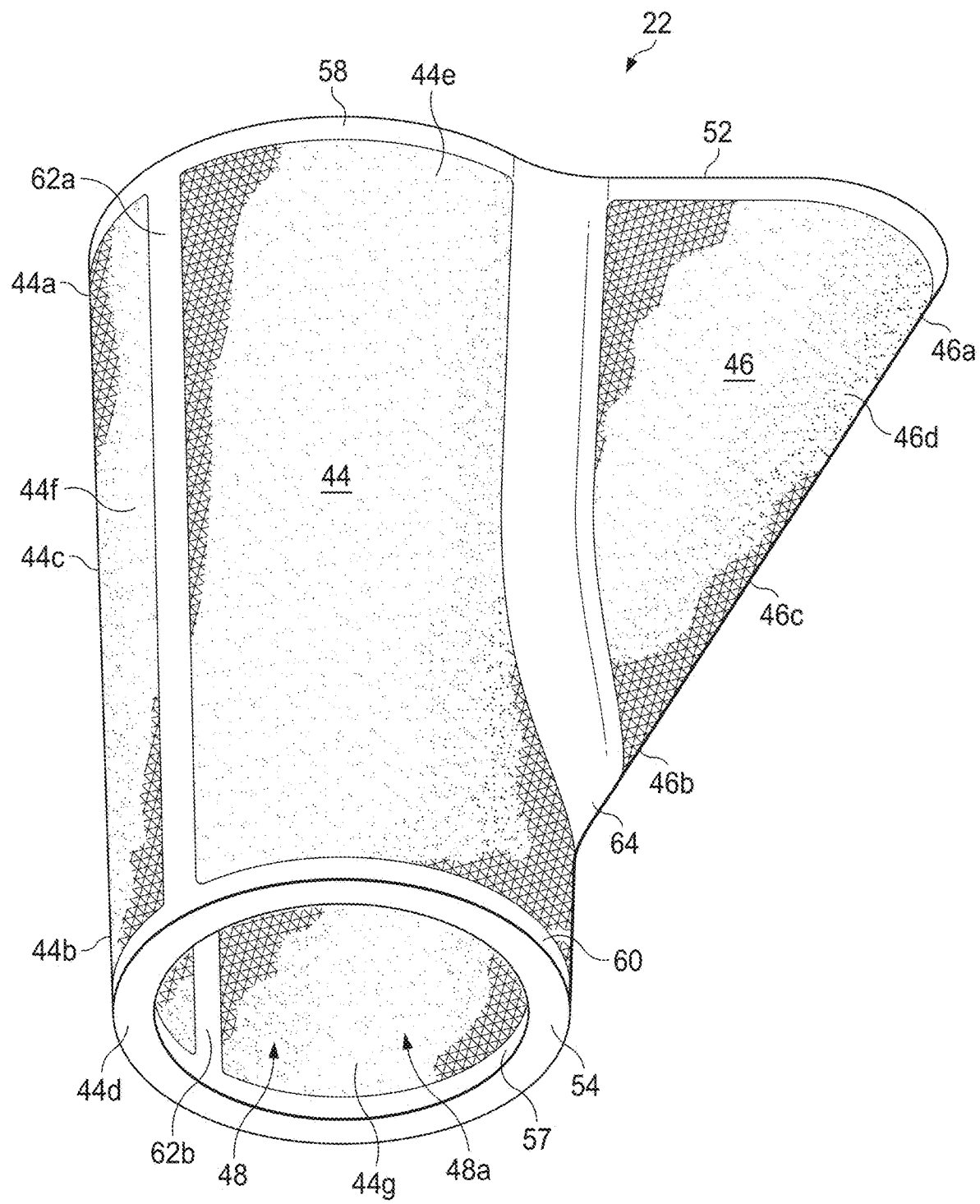
FIG. 8 is another perspective view of the hip cone of FIGS. 3, 5, 6, and 7, according to one or more embodiments of the present disclosure.
Figure 9:
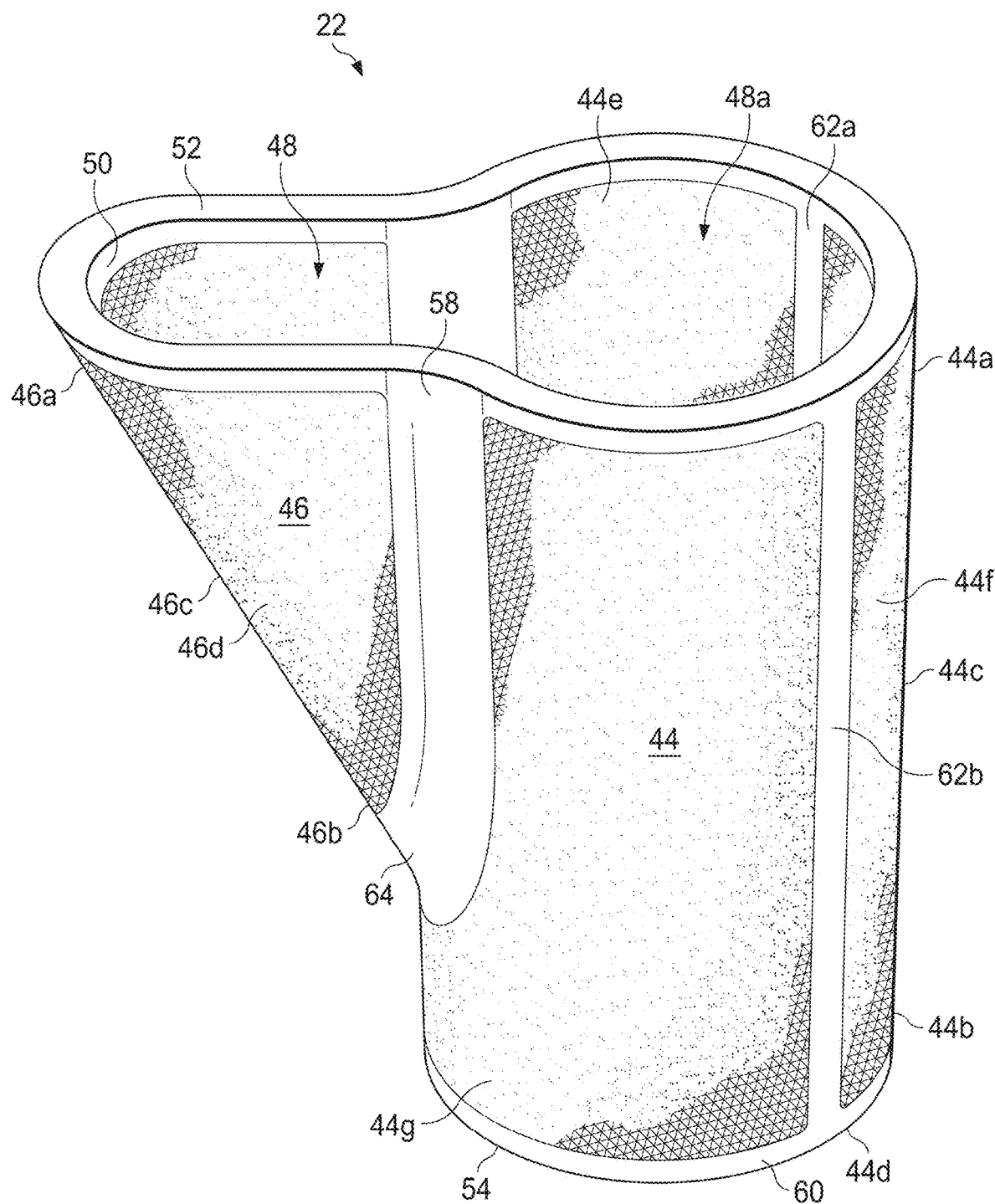
FIG. 9 is yet another perspective view of the hip cone of FIGS. 3, 4, 6, 7, and 8, according to one or more embodiments of the present disclosure.

The spout portion 46 includes an upper end portion 46a and a lower end portion 46b. An oblong-shaped partial cone portion, or angled portion 46c, of the spout portion 46 extends between the upper end portion 46a and the lower end portion 46b. The upper end portion 44a of the main portion, and the upper end portion 46a of the spout portion 46, are contiguous so that together they form a contiguous, keyhole-slot-shaped opening 50 at a top end 52 of the hip cone 22, as best shown in FIG. 6. The lower end portion 46b of the spout portion 46 terminates at the main portion so that the lower end portion 46b is axially spaced from a bottom end 44d of the main portion, which bottom end 44d is the same as a bottom end 54 of the hip cone 22; this axial spacing defines a spacing 56 (FIG. 5). Accordingly, the bottom end 54 of the hip cone 22 defines a circular-shaped opening 57, which is different from the keyhole-slot-shaped opening 50 at the top end 52 of the hip cone 22; in several example embodiments, the opening 57 has an opening that is a circular shape, an ovoid shape, an oblong shape, or an irregular shape.

In one or more embodiments, the angled portion 46c is angled with respect to the main portion, so that respective portions of the angled portion 46c and the main portion define an obtuse angle, which is equal to, or close to within 1, 2, 3, 4, 5, 6, 7, 8, 9, 10, 11, 12, 13, 14, 15, 16, 17, 18, 19, or 20 degrees or any other degree between 0 and 30 degrees, the angle 12e defined by the stem 12.

As shown in FIGS. 5, 6, 7, 8, and 9, in some example embodiments, the hip cone 22 includes some portions that are porous (i.e., composed of porous material and/or coated with a porous coating), and includes other portions that are not porous or at least less porous than the porous portions (e.g., not composed of porous material and not coated with a porous coating); for example, an upper portion 58 of the hip cone 22 is not porous and is not coated, with the shape of the upper portion 58 corresponding to the shape of the top end 52 of the hip cone 22, and to the shape of the keyhole-slot-shaped opening 50 at the top end 52. For another example, a lower portion 60 of the hip cone 22 is not porous and is not coated, with the shape of the lower portion 60 of the hip cone 22 corresponding to the shape of the bottom end 54 of the hip cone 22, and to the shape of the circular-shaped opening 57 at the bottom end 54. For yet another example, vertically-extending portions 62a and 62b of the main portion extend between the upper portion 58 and the lower portion 60, and are not porous and are not coated. For still yet another example, a U-shaped portion 64, which extends downward from the upper portion 58 at the adjoinment of the spout portion 46 to the main portion, is not porous and is not coated. In contrast, a porous portion 44e of the main portion of the hip cone 22 is defined between the upper portion 58 of the hip cone 22 and lower portion 60 of the hip cone 22, and between the vertically-extending portion 62a and the U-shaped portion 64. A porous portion 44f is defined between the upper portion 58 of the hip cone 22 and lower portion 60 of the hip cone 22, and between the vertically-extending portion 62a and the vertically-extending portion 62b. A porous portion 44g of the main portion of the hip cone 22 is defined between the upper portion 58 of the hip cone 22 and lower portion 60 of the hip cone 22, and between the vertically-extending portion 62b and the U-shaped portion 64. A porous portion 46d is defined by, and bounded by, the upper portion of the hip cone 22 and the U-shaped portion 64.

In several example embodiments, each of the porous portions 44e, 44f, 44g, and 46d is: composed of one or more porous materials at the outside thereof, the inside thereof, all the way through from the outside thereof to the inside thereof, or any combination thereof; coated with one or more porous coatings at the outside thereof, the inside thereof, all the way through from the outside thereof to the inside thereof, or any combination thereof; both (i) composed of one or more porous materials at the outside thereof, the inside thereof, all the way through from the outside thereof to the inside thereof, or any combination thereof, and (ii) coated with one or more porous coatings at the outside thereof, the inside thereof, all the way through from the outside thereof to the inside thereof, or any combination thereof.

In several example embodiments, each of the portions 58, 60, 62a, 62b, and 64 is non-porous or has a porosity (void fraction) that is less than the porosity of one or more of the porous portions 44e, 44f, 44g, and 46d. For example, in one or more embodiments, one or more of the portions 58, 60, 62a, 62b, and 64 is coated with a porous coating but is not composed of a porous material (or is composed of a less porous material), in contrast to the porous material of which one or more of the porous portions 44e, 44f, 44g, and 46d are composed.

In several example embodiments, each of the portions 58, 60, 62a, 62b, and 64 is non-porous, or has a porosity that is less than the porosity of one or more of the porous portions 44e, 44f, 44g, and 46d, so that the portions 58, 60, 62a, 62b, and 64 provide a structural frame for the hip cone 22, and/or improve the hip cone 22's overall strength, structural integrity, rigidity, etc.

In several example embodiments, the hip cone 22 does not include portions that are not coated with a coating configured to promote biologic fixation; instead, the hip cone 22 in its entirely is coated with coating(s) configured to promote biologic fixation.

Further, in several example embodiments, the hip cone 22 does not include portions that are not porous; instead, for example, the hip cone 22 is a unitary piece composed of material(s) configured to promote biologic fixation at the external surfaces of the hip cone 22, at the internal surfaces of the hip cone 22, and therebetween; for example, in one or more embodiments, the hip cone 22 is a unitary piece at least initially composed of, for example, porous metal(s) throughout, which porous metal(s) are configured to promote biologic fixation at the external surfaces of the hip cone 22, at the internal surfaces of the hip cone 22, and therebetween.

Still further, in several example embodiments, the hip cone 22 does not include portions that are not coated with a coating configured to promote biologic fixation, and the hip cone 22 does not include portions that are not porous; instead, the hip cone 22 in its entirely is coated with a coating configured to promote biologic fixation, and the hip cone 22 is a unitary piece composed of material configured to promote biologic fixation at the external surfaces of the hip cone 22 and at the internal surfaces of the hip cone 22; for example, in one or more embodiments, the hip cone 22 is a unitary piece composed of, for example, porous metal(s) throughout, which porous metal(s) are configured to promote biologic fixation at the external surfaces of the hip cone 22, at the internal surfaces of the hip cone 22, and therebetween.

In several example embodiments, at least a portion of the hip cone 22 is coated with a hydroxyapatite (HA) coating; in several example embodiments, one or more of the porous portions 44e, 44f, 44g, and 46d include a hydroxyapatite (HA) coating; in several example embodiments, at least a portion of the stem 12 includes hydroxyapatite (HA) coating.

In several example embodiments, the hip cone 22 is either fully porous coated or hydroxyapatite (HA) coated; in several example embodiments, at least one of the porous portions 44e, 44f, 44g, and 46d is either fully porous coated or hydroxyapatite (HA) coated; in several example embodiments, the stem 12 is either fully porous coated or hydroxyapatite (HA) coated.

In several example embodiments, at least a portion of the hip cone 22 is coated with either ZTT™ porous coating or ZT™ HA coating from Johnson & Johnson MedTech; in several example embodiments, one or more of the porous portions 44e, 44f, 44g, and 46d are coated with either ZTT™ porous coating or ZT™ HA coating; in several example embodiments, at least a portion of the stem 12 is coated with either ZTT™ porous coating or ZT™ HA coating.

In several example embodiments, at least a portion of the hip cone 22 is coated with POROCOAT™ Porous Coating, which is composed of commercially pure titanium sintered metal beads, and which is from Johnson & Johnson MedTech; in several example embodiments, one or more of the porous portions 44e, 44f, 44g, and 46d include POROCOAT™ Porous Coating; in several example embodiments, at least a portion of the stem 12 includes POROCOAT™ Porous Coating.

In several example embodiments, the hip cone 22 is composed of titanium mesh. In several example embodiments, one or more of the portions 44e, 44f, 44g, and 46d are composed of titanium mesh. In several example embodiments, one or more of the portions 58, 60, 62a, 62b, and 64 are composed of titanium mesh.

In several example embodiments, the hip cone 22 is composed of titanium mesh and/or one or more other porous materials. In several example embodiments, one or more of the portions 44e, 44f, 44g, and 46d of the hip cone 22 are composed of titanium mesh and/or one or more other porous materials. In several example embodiments, one or more of the portions 58, 60, 62a, 62b, and 64 of the hip cone 22 are composed of titanium mesh and/or one or more other porous materials. In several example embodiments, at least a portion of the stem 12 is composed of titanium mesh and/or one or more other porous materials.

Figure 10:
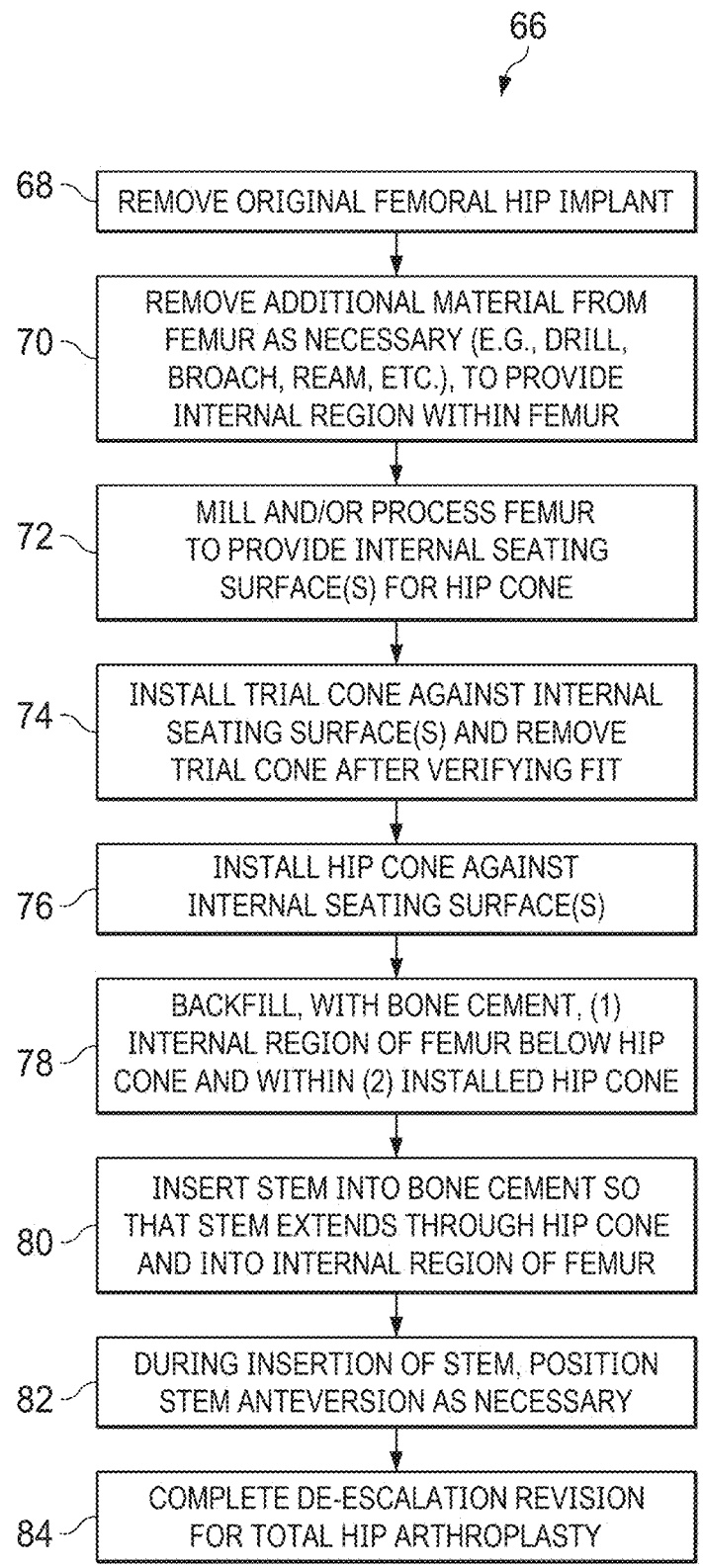
FIG. 10 is a flow chart illustration of a method of a de-escalation revision for total hip arthroplasty using the system of FIG. 3, according to one or more embodiments of the present disclosure.

In one or more embodiments, as illustrated in FIG. 10 with continuing reference to FIGS. 1, 2, 3, 4, 5, 6, 7, 8, and 9, a method of a de-escalation revision for total hip arthroplasty, using the system of FIG. 3, is generally referred to by the reference numeral 66. In several example embodiments, one or more steps illustrated in FIG. 10 are omitted. In several example embodiments, the method 66 includes one or more additional steps and/or one or alternate steps. In several example embodiments, the method 66 omits one or more of the steps shown in FIG. 10, includes one or more additional steps not shown in FIG. 10, includes one or more alternate steps not shown in FIG. 10, or any combination thereof.

As shown in FIG. 10, in one or more example embodiments, the method 66 includes removing an original hip implant at step 68 and, at step 70, removing additional material from the femur 14 as necessary, to provide the internal region 18 within the femur 14. At step 72, internal seating surface(s) of the portion 20a of the interior surface(s)

20 of the femur 14 are provided, which internal seating surface(s) are configured to engage the hip cone 22. At step 74, a trial cone (not shown in any figure) is installed and engages the internal seating surface(s) provided at the step 72 to verify suitability of fit of the hip cone 22, and then the trial cone is removed from the femur 14 after fit is verified. At step 76, the hip cone 22 is installed against the internal seating surface(s) of the portion 20a of the interior surface(s) 20 of the femur 14. At step 78, the internal region 18 within the femur 14 and below the hip cone 22 is backfilled with the bone cement 16, and the hip cone 22 is also backfilled with the bone cement 16. At step 80, the stem 12 is inserted into the bone cement 16 so that the stem 12 extends through the hip cone 22 and into the internal region 18 within the femur 14 and below the hip cone 22. During the step 80, the anteversion of the stem 12 is set or positioned as necessary at step 82. The method 10 is completed at step 84; the step 84 includes one or more steps, wide varieties of steps, one or more combinations of steps, etc.

Figure 11:
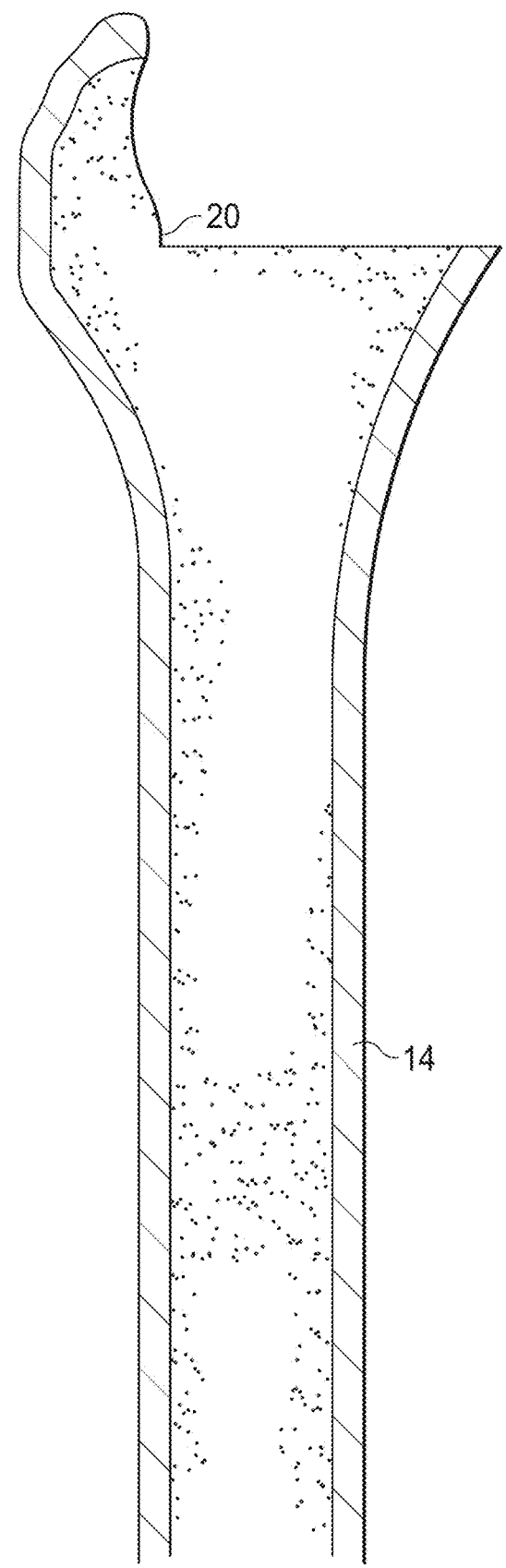
FIG. 11 is a sectional view of the femur of FIG. 3 during execution of the method of FIG. 10, according to one or more embodiments of the present disclosure.

In one or more embodiments, as illustrated in FIG. 11 with continuing reference to FIGS. 1, 2, 3, 4, 5, 6, 7, 8, and 9, as noted above the step 68 includes removing an original hip implant (not shown) from the femur 14, exposing at least a portion of the interior surface(s) 20 of the femur 14.

Figure 12:
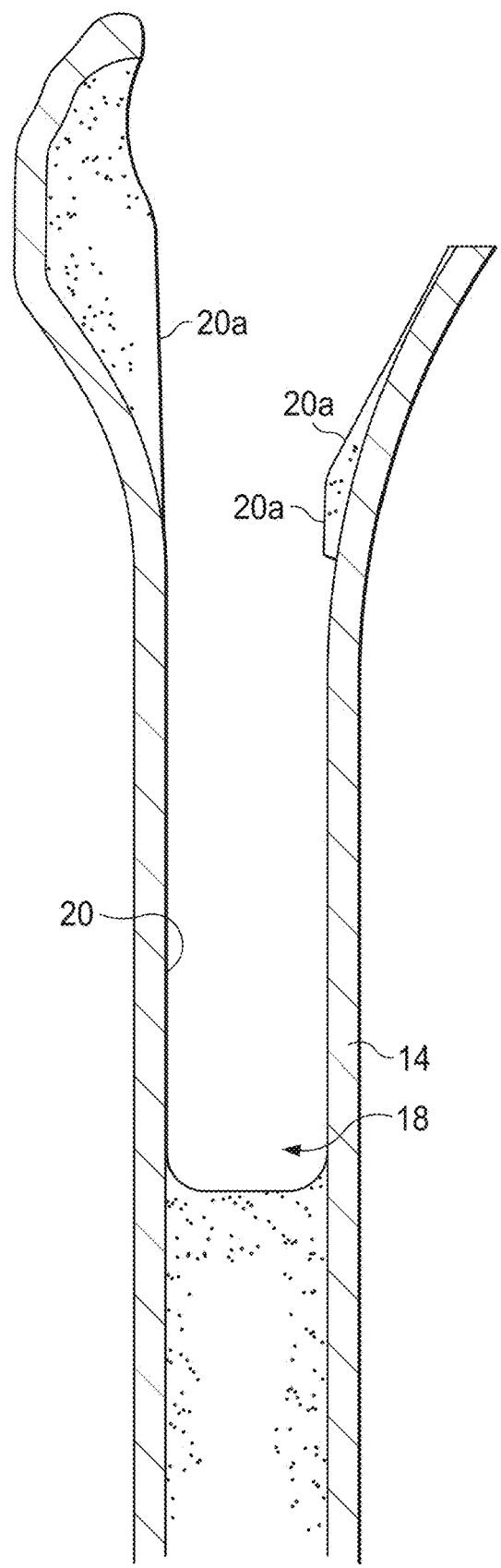
FIG. 12 is another sectional view of the femur of FIGS. 3 and 11, during execution of the method of FIG. 10, according to one or more embodiments of the present disclosure.

In one or more embodiments, as illustrated in FIG. 12 with continuing reference to FIGS. 1, 2, 3, 4, 5, 6, 7, 8, 9, 10, and 11, as noted above the step 70 includes removing additional material from the femur 14 as necessary, to provide the internal region 18 within the femur 14. In several example embodiments, material removal at the step 70 includes drilling steps, broaching steps, reaming steps, other steps, etc., or combination(s) thereof.

With continuing reference to FIG. 12, as noted above the step 72 includes providing internal seating surface(s) of the portion 20a of the interior surface(s) 20 of the femur 14, which internal seating surface(s) are configured to engage the hip cone 22. In several example embodiments, the step 72 includes milling steps, other processing steps, etc., or combination(s) thereof.

As noted above, the step 74 includes installing a trial cone (not shown in any figure) so that the trial cone engages the internal seating surface(s) of the portion 20a of the interior surface(s) 20 of the femur 14, which internal seating surface(s) of the portion 20a are provided at the step 72; after the fit of the trial cone against the internal seating surface(s) is verified, and thus suitability of fit of the hip cone 22 is verified, the trial cone is removed from the femur 14.

Figure 13:
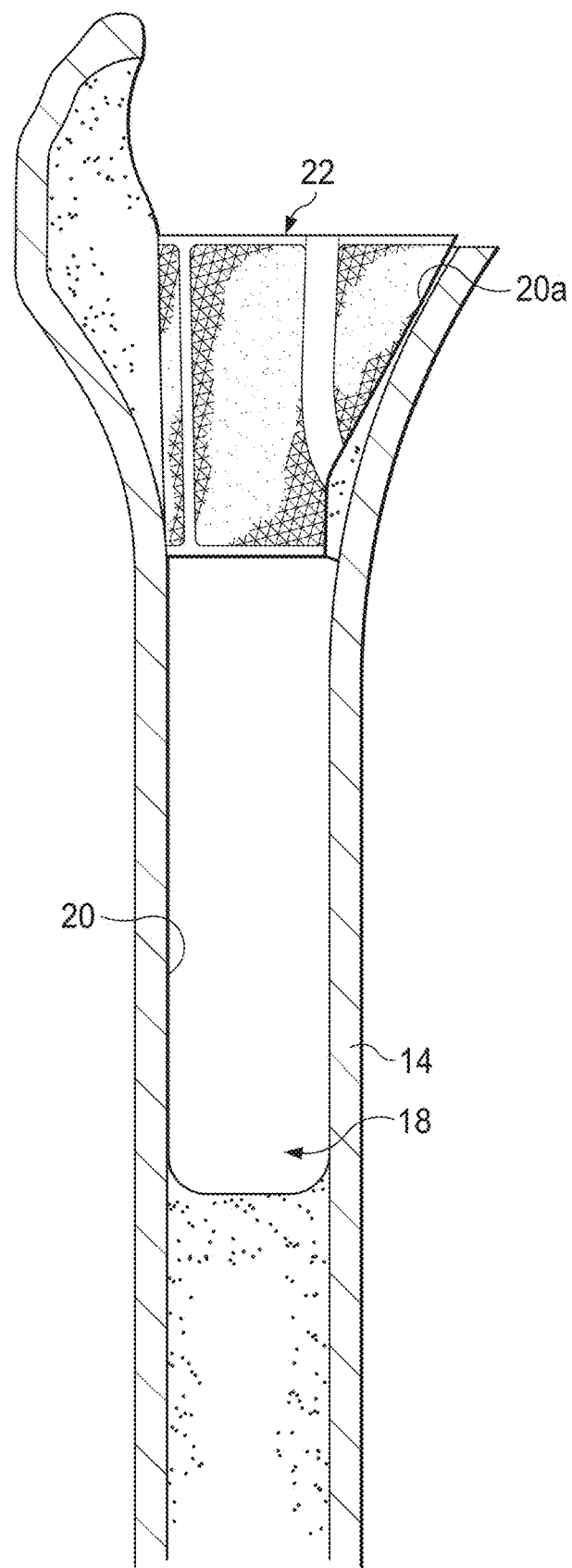
FIG. 13 is a view similar to that of FIG. 12, but also illustrates the hip cone of FIGS. 3, 4, 5, 6, 7, 8, and 9 during execution of the method of FIG. 10, according to one or more embodiments of the present disclosure.

In one or more embodiments, as illustrated in FIG. 13 with continuing reference to FIGS. 1, 2, 3, 4, 5, 6, 7, 8, 9, 10, 11, and 12, as noted above the step 76 includes installing the hip cone 22 against the internal seating surface(s) of the portion 20a of the interior surface(s) 20 of the femur 14.

Figure 14:
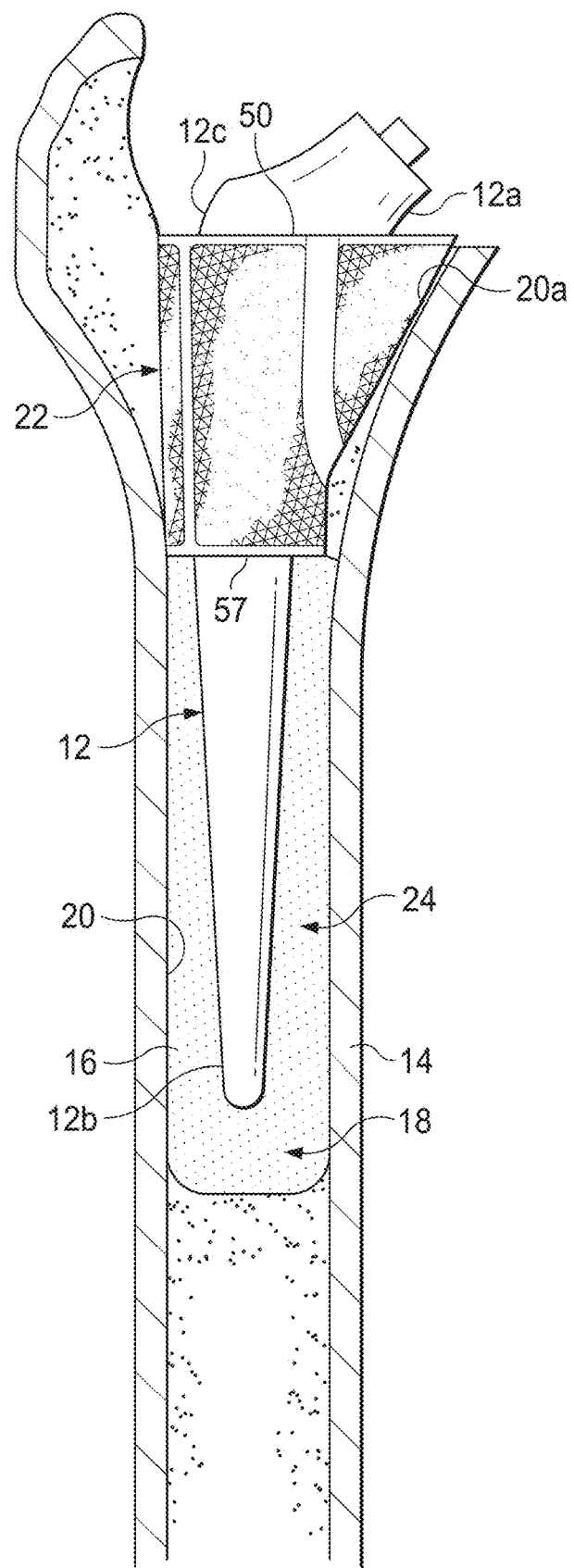
FIG. 14 is a view similar to that of FIG. 13, but also illustrates the stem of FIGS. 3 and 4 during execution of the method of FIG. 10, according to one or more embodiments of the present disclosure.

In or more embodiments, as illustrated in FIG. 14 with continuing reference to FIGS. 1, 2, 3, 4, 5, 6, 7, 8, 9, 10, 11, 12, and 13, as noted above the step 78 includes backfilling, with the bone cement 16, the internal region 18 of the femur 14 below the hip cone 22, and also backfilling the internal region 48 of the hip cone 22 with the bone cement 16. In several example embodiments, the step 78 is carried out using a cement mixing and delivery system such as, for example, the Revolution™ Cement Mixer System from Stryker; in several example embodiments, one or more other cement mixing and delivery systems from companies other than Stryker are used at the step 78. The step 78 provides immediate mechanical fixation because the bone cement provides immediate mechanical fixation between, and among, at least the femur 14 and the hip cone 22.

With continuing reference to FIG. 14, as noted above the step 80 includes inserting the stem 12 through the hip cone 22 and into the internal region 18 of the femur 14. In several example embodiments, the step 80 is executed before, during, or after the step 78. At the step 80, the stem 12 extends through the keyhole-slot-shaped opening 50 at the top end 52 of the hip cone 22. The stem 12 extends through the circular-shaped (or other-shaped) opening 57 at the bottom end 54. As shown in FIGS. 14, as well as in FIGS. 1 and 2, the proximal end portion 12a of the stem 12 is located above the hip cone 22, and the distal end portion 12b of the stem 12 is located below the hip cone 22. The annular-type region 24 is defined between the stem 12 and a portion 20b of the interior surface(s) 20 of the femur 14. The annular-type region 24 is part of the internal region 18 defined in the femur 14. The annular-type region 24 is filled with the bone cement 16. The annular-type region 34 is defined between the stem 12 and the interior surface(s) 32 of the hip cone 22. The annular-type region 34 is part of the internal region 18 defined in the femur 14, and is in fluid communication with the portion of the internal region 18 below the hip cone 22, including the annular-type region 24. The annular-type region 34 is filled with the bone cement 16.

At the steps 78 and 80, in several example embodiments, the bone cement 16 provided at the step 78 provides immediate mechanical fixation between, and among, the stem 12, the femur 14, and the hip cone 22; the system 10 provides biologic fixation after the immediate mechanical fixation, as will be described in further detail below.

With continuing reference to FIG. 14, the step 82 includes setting or positioning anteversion as necessary, rotating the stem 12 relative to the hip cone 22 and/or the femur 14. In several example embodiments, the step 82 is executed before, during, or after the step 78, the step 80, the step 84, or any combination thereof.

As noted above, the step 84 includes completing the method 66, including completing the de-escalation revision for total hip arthroplasty. Before, during, or after the step 84, and as illustrated in FIG. 3, the head 26 is operably coupled to the proximal end portion 12a of the stem 12, the cup 28 is operably coupled to the head 26, and the cup 28 is also operably coupled to the pelvis 30.

In operation, in one or more embodiments and after execution of the method 66, that is, after completing the de-escalation revision for total hip arthroplasty, the system 10 operates like a human hip joint, and/or like the original hip implant removed in the step 68 of the method 10.

In several example embodiments, the material of which the hip cone 22 is composed permits, promotes, and facilitates bone growth through, in, and around the hip cone 22. For example, in one or more embodiments, the hip cone 22 or one or more portions thereof are composed of a titanium mesh, and the titanium mesh permits, promotes, and facilitates bone growth through, in, and/or around the hip cone 22, and/or biologic ingrowth into the hip cone 22. For another example, in one or more embodiments, the hip cone 22 or one or more portions thereof are composed of titanium trabecular metal, and the titanium trabecular metal permits, promotes, and facilitates bone grown through, in, and/or around the hip cone 22, and/or biologic ingrowth into the hip cone 22. For another example, in one or more embodiments, the hip cone 22 or one or more portions thereof are composed of three-dimensionally-printed ingrowth material (such as 3D-printed titanium ingrowth material), and the 3D-printed ingrowth material permits, promotes, and facilitates bone grown through, in, and/or around the hip cone 22, and/or biologic ingrowth into the hip cone 22. In several example embodiments, the hip cone 22 is produced by 3D printing, with one or more processors executing a plurality of instructions stored on a non-transitory computer readable medium to control a three-dimensional printer that produces the hip cone 22 by three-dimensionally printing the hip cone 22.

In several example embodiments, the above-described porous coating(s) of the hip cone 22 permit, promote, and facilitate bone growth through, in, and around the hip cone 22. In several example embodiments, the above-described porous coating(s) of the hip cone 22 permit, promote, and facilitate biologic ingrowth into the hip cone 22.

In several example embodiments, the method 66 is a "de-escalation" revision because, for example: the length of the stem 12 of the system 10 may be significantly less the respective lengths of other constructs (artificial structures or prosthetic components) used in other femoral revision techniques; the amount of bone removal at the step 70 is decreased, as compared to the amount of bone removal during other femoral revision techniques; the risk of infection could potentially be decreased; the risk of dislocation could potentially be decreased; and the risk of fracture could potentially be decreased. In several example embodiments, the length of the stem 12 may not be significantly less than the respective lengths of other constructs.

As noted above, in several example embodiments, the system 10 provides biologic fixation after the immediate mechanical fixation provided by the bone cement 16. More particularly, at least a portion of the hip cone 22 is configured to promote biologic fixation; accordingly, the system 10, or at least the hip cone 22 or the stem 12 thereof, experiences at least two types of biologic fixations after the immediate mechanical fixation provided by the bone cement 16; these two types are biologic ingrowth and biologic ongrowth. For example, the hip cone 22 experiences both biologic ingrowth and biologic ongrowth, with human bone growing into the porous structures of the hip cone 22 (bony ingrowth) and onto the various surfaces of the hip cone 22 (ongrowth). In several example embodiments, the biologic fixation is facilitated or promoted by the porous material(s) of the hip cone 22 and/or the above-described coatings of the hip cone 22. For another example, the stem 12 experiences both biologic ingrowth and biologic ongrowth, with human bone growing into the porous structures (if present) of the stem 12 (ingrowth) and onto the various surfaces of the hip cone 12 (ongrowth). In several example embodiments, the biologic fixation is facilitated or promoted by porous material(s) of the stem 12 and/or the above-described coatings of the stem 12.

In several example embodiments, instead of a de-escalation revision for total hip arthroplasty, the system 10 and/or the method 66 is used in other situations involving deficient proximal bone. For example, in some embodiments the system 10 and/or the method 66, and/or steps and/or components thereof (such as the hip cone 22), are used in connection with the removal of tumor(s). For another example, in some embodiments the system 10 and/or the method 66, and/or steps and/or components thereof (such as the hip cone 22), are used in connection with the removal of other types of fixation (e.g., plates/screws, femoral nail, blade plate, etc.). For yet another example, in some embodiments the system 10 and/or the method 66, and/or steps and/or components thereof (such as the hip cone 22), are used in connection with a primary setting involving very poor osteoporotic bone.

In one or more embodiments, a kit includes one or more components of the system 10; in several example embodiments, the kit includes the cup 28, the head 26, the stem 12, the hip cone 22, the bone cement 16, or any combination thereof; in several example embodiments, the components of the kit are arranged, and then operate, in accordance with the foregoing descriptions of the system 10 and/or the method 66; in several example embodiments, the kit includes: a plurality of the cups 28, each of the cups 28 having a different size; a plurality of the heads 26, each of the heads 26 having a different size; a plurality of the stems 12, each of the stems 12 having a different size; a plurality of the hip cones 22, each of the hip cones 22 having a different size; or any combination thereof; in several example embodiments, the different sizes of the components correspond to, and are adapted to fit with, different sizes of the femur 14 and/or the pelvis 30, and/or other factor(s) of the human to which the femur 14 and pelvis 30 belong; in several example embodiments, the kit includes three hip cones 22 for each of the stem(s) 12 in the kit, with each of the hip cones 22 having a different size such as, for example, a different outer diameter defined by the main portion 44 of the hip cone 22; in; in several example embodiments, each of the hip cones 22 in the kit may have a different size such as, for example, a different transverse extension length of the respective spout portion 46 at the top end 52 of the hip cone 22, with the direction of the transverse extension length being generally perpendicular to the spacing 56; in several example embodiments, each of the hip cones 22 in the kit may have a different size such as, for example, a different height extension from the bottom end 54 of the hip cone 22 to the top end 52 of the hip cone 22; in several example embodiments, each of the stems 12 in the kit may have a different size such as, for example, a different length of the distal end portion 12$b$ of the stem 12, a different length the proximal end portion 12$a$ from the end operably coupled to the head 26 to the transition portion 12$c$, a different lateral offset distance between a center vertical axis of the distal end portion 12$b$ and the end of the proximal end portion 12$a$ operably coupled to the head 26, a different vertical height defined by the proximal end portion 12$a$ from about the center of the transition portion 12$c$ to the end of the portion 12$a$ operably coupled to the head 26.

Figure 15:
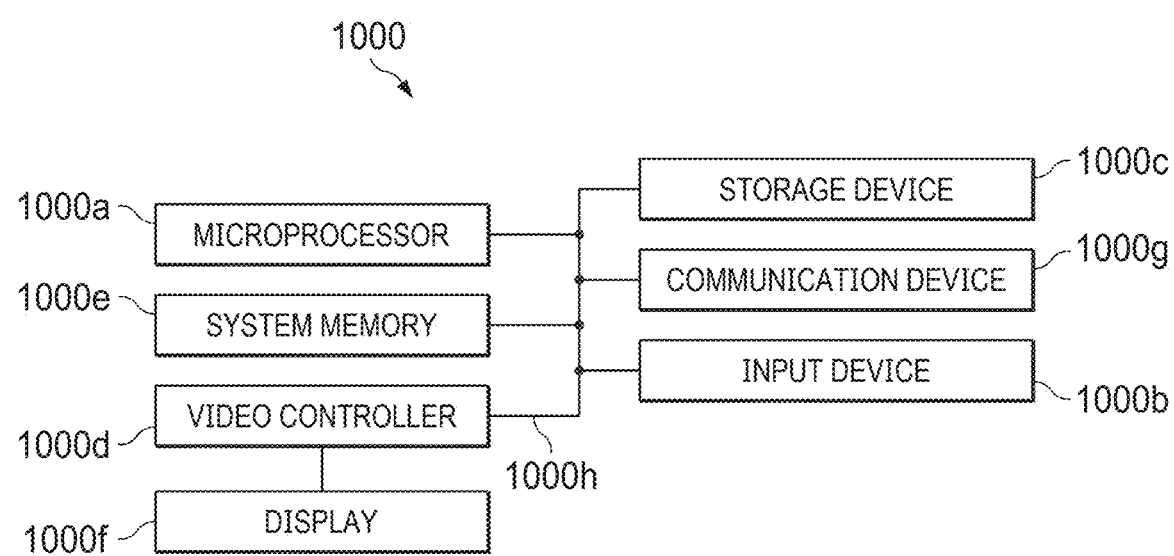
FIG. 15 is a diagrammatic illustration of a computing node for implementing one or more embodiments of the present disclosure, according to one or more embodiments.

In or more embodiments, as illustrated in FIG. 15 with continuing reference to FIGS. 1, 2, 3, 4, 5, 6, 7, 8, 9, 10, 11, 12, 13, and 14, a computing node 1000 for implementing one or more of the above-described embodiments, and/or any combination thereof, is depicted. The node 1000 includes a microprocessor 1000$a$, an input device 1000$b$, a storage device 1000$c$, a video controller 1000$d$, a system memory 1000$e$, a display 1000$f$, and a communication device 1000$g$ all interconnected by one or more buses 1000$h$. In one or more embodiments, the storage device 1000$c$ may include a floppy drive, hard drive, CD-ROM, optical drive, any other form of storage device or any combination thereof. In one or more embodiments, the storage device 1000$c$ may include, and/or be capable of receiving, a floppy disk, CD-ROM, DVD-ROM, or any other form of computer-readable medium that may contain executable instructions. In one or more embodiments, the communication device 1000$g$ may include a modem, network card, or any other device to enable the node 1000 to communicate with other nodes. In one or more embodiments, any node represents a plurality of interconnected (whether by intranet or Internet) computer systems, including without limitation, personal computers, mainframes, PDAs, smartphones and cell phones; in one or more embodiments, one or more of the components of any of the above-described embodiments include at least the node and/or components thereof, and/or one or more nodes that are substantially similar to the node and/or components thereof. In one or more embodiments, one or more of the above-described components of the node and/or the above-described embodiments include respective pluralities of same components.

In one or more embodiments, one or more of the components of any of the above-described embodiments include at least the node 1000 and/or components thereof, and/or one or more nodes that are substantially similar to the node 1000 and/or components thereof. In one or more embodiments, one or more of the above-described components of the node 1000 and/or the above-described embodiments include respective pluralities of same components.

In one or more embodiments, a computer system includes at least hardware capable of executing machine readable instructions, as well as the software for executing acts (typically machine-readable instructions) that produce a desired result. In one or more embodiments, a computer system includes hybrids of hardware and software, as well as computer sub-systems. In one or more embodiments, hardware generally includes at least processor-capable platforms, such as client-machines (also known as personal computers or servers), and hand-held processing devices (such as smart phones, tablet computers, personal digital assistants (PDAs), or personal computing devices (PCDs), for example). In one or more embodiments, hardware may include any physical device that is capable of storing machine-readable instructions, such as memory or other data storage devices. In one or more embodiments, other forms of hardware include hardware sub-systems, including transfer devices such as modems, modem cards, ports, and port cards, for example.

In one or more embodiments, software includes any machine code stored in any memory medium, such as RAM or ROM, and machine code stored on other devices (such as floppy disks, flash memory, or a CD-ROM, for example). In one or more embodiments, software may include source or object code. In one or more embodiments, software encompasses any set of instructions capable of being executed on a node such as, for example, on a client machine or server. In one or more embodiments, combinations of software and hardware could also be used for providing enhanced functionality and performance for certain embodiments of the present disclosure. In one or more embodiments, software functions may be directly manufactured into a silicon chip. Accordingly, combinations of hardware and software are also included within the definition of a computer system and are thus envisioned by the present disclosure as possible equivalent structures and equivalent methods. In one or more embodiments, computer readable mediums include, for example, passive data storage, such as a random-access memory (RAM) as well as semi-permanent data storage such as a compact disk read only memory (CD-ROM). One or more embodiments of the present disclosure may be embodied in the RAM of a computer to transform a standard computer into a new specific computing machine. In one or more embodiments, data structures are defined organizations of data that may enable one or more embodiments of the present disclosure. In one or more embodiments, data structure may provide an organization of data, or an organization of executable code. In one or more embodiments, any networks and/or one or more portions thereof, may be designed to work on any specific architecture. In one or more embodiments, one or more portions of any networks may be executed on a single computer, local area networks, client-server networks, wide area networks, internets, hand-held and other portable and wireless devices and networks. In one or more embodiments, database may be any standard or proprietary database software. In one or more embodiments, the database may have fields, records, data, and other database elements that may be associated through database specific software. In one or more embodiments, data may be mapped. In one or more embodiments, mapping is the process of associating one data entry with another data entry. In one or more embodiments, the data contained in the location of a character file can be mapped to a field in a second table. In one or more embodiments, the physical location of the database is not limiting, and the database may be distributed. In one or more embodiments, the database may exist remotely from the server, and run on a separate platform. In one or more embodiments, the database may be accessible across the Internet. In one or more embodiments, more than one database may be implemented.

In one or more embodiments, a plurality of instructions stored on a non-transitory computer readable medium may be executed by one or more processors to cause the one or more processors to carry out, implement, or produce, in whole or in part, one or more of the above-described embodiments, and/or any combination thereof, including, for example, the method 66 and/or one or more steps thereof, the system 10 and/or one or more components thereof, or any combination thereof. In one or more embodiments, such one or more processors may be or include one or more of the microprocessor 1000a, one or more other processors, one or more other controllers, any processor(s) that are part of the components of the above-described embodiments, and/or any combination thereof, and such a non-transitory computer readable medium may be distributed among one or more components of the above-described systems. In one or more embodiments, such one or more processors may execute the plurality of instructions stored on the non-transitory computer readable medium in connection with a 3D printing system including a three-dimensional (3D) printer to, for example, produce one or more of the components of the system 10 such as, for example, the hip cone 22 or portion(s) thereof; in one or more embodiments, such a 3D printing system includes the 3D printer and the node 1000, which: may be integrated with, or part of, the 3D printer; may be operably coupled to the 3D printer; may include the one or more processors and/or the non-transitory computer readable medium; or any combination thereof. In one or more embodiments, such one or more processors may execute the plurality of instructions stored on the non-transitory computer readable medium to implement or carry out one or more steps of the method 66; in or more embodiments, such one or more processors and/or the non-transitory computer readable medium may be part of a robotic and/or computer-controlled surgical system; in one or more embodiments, such one or more processors and/or the non-transitory computer readable medium may be part of the node 1000, which may be part of, or operably coupled to, the robotic and/or computer-controlled surgical system. In one or more embodiments, such one or more processors may execute the plurality of instructions in connection with a virtual computer system. In one or more embodiments, such a plurality of instructions may communicate directly with the one or more processors, and/or may interact with one or more operating systems, middleware, firmware, other applications, and/or any combination thereof, to cause the one or more processors to execute the instructions.

A method is described according to one or more embodiments of the present disclosure, which embodiments include, for example, a method for complex primary, conversion, or revision total hip replacement; in one or more embodiments, the method includes: installing a hip cone within a first internal region defined within a femur, the hip cone defining a second internal region; backfilling, with bone cement, the first internal region defined within the femur and the second internal region defined by the hip cone; and inserting a femoral stem through the second internal region defined by the hip cone so that: a first portion of the femoral stem extends within the second internal region defined by the hip cone; and a second portion of the femoral stem extends outside the hip cone and within the first internal region defined within the femur. In one or more embodiments, the first internal region defined within the femur defines interior surface(s) of the femur; wherein a first annular-type region is defined between the femoral stem and the interior surface(s) of the femur; and wherein the first annular-type region is filled with the bone cement so that the second portion of the femoral stem, which extends outside the hip cone and within the first internal region defined within the femur, is surrounded by the bone cement. In one or more embodiments, the second internal region defined by the hip cone defines interior surface(s) of the hip cone; wherein a second annular-type region is defined between the femoral stem and the interior surface(s) of the hip cone; wherein the second annular-type region is filled with the bone cement so that the first portion of the femoral stem, which extends within the second internal region of the hip cone, is surrounded by the bone cement; and wherein the bone cement unitizes the femoral stem to the hip cone, creating a united construct comprising the femoral stem and the hip cone. In one or more embodiments, the first internal region defined within the femur defines interior surface(s) of the femur; wherein a first annular-type region is defined between the femoral stem and the interior surface(s) of the femur; wherein the first annular-type region is filled with the bone cement so that the second portion of the femoral stem, which extends outside the hip cone and within the first internal region defined within the femur, is surrounded by the bone cement; wherein the second internal region defined by the hip cone defines interior surface(s) of the hip cone; wherein a second annular-type region is defined between the femoral stem and the interior surface(s) of the hip cone; and wherein the second annular-type region is filled with the bone cement so that the first portion of the femoral stem, which extends within the second internal region of the hip cone, is surrounded by the bone cement. In one or more embodiments, the method includes removing material from the femur to provide the first internal region defined within the femur; and providing internal seating surface(s) of the femur, which internal seating surface(s) are configured to engage the hip cone; wherein installing the hip cone within the first internal region defined within a femur includes installing the hip cone against the internal seating surface(s) of the femur. In one or more embodiments, the method includes setting or positioning anteversion of the femoral stem: before inserting the femoral stem through the second internal region; during inserting the femoral stem through the second internal region; after inserting the femoral stem through the second internal region; or any combination thereof. In one or more embodiments, the femoral stem is inserted through the second internal region defined by the hip cone: before backfilling, with the bone cement, the first internal region defined within the femur and the second internal region defined by the hip cone; during backfilling, with the bone cement, the first internal region defined within the femur and the second internal region defined by the hip cone; after backfilling, with the bone cement, the first internal region defined within the femur and the second internal region defined by the hip cone; or any combination thereof.

Another method is described according to one or more embodiments of the present disclosure, which embodiments include, for example, a method for complex primary, conversion, or revision total hip replacement; in one or more embodiments, the method includes: removing an original hip implant from a femur; installing a hip cone in the femur; inserting a femoral stem through the hip cone installed in the femur; effecting immediate mechanical fixation among the femur, the hip cone, and the femoral stem; and effecting biologic fixation between the femur and the hip cone. In one or more embodiments, the mechanical fixation unitizes the femoral stem to the hip cone, creating a united construct comprising the femoral stem and the hip cone. In one or more embodiments, a first internal region is defined within the femur; wherein installing the hip cone in the femur includes installing the hip cone within the first internal region defined within the femur; wherein the hip cone defines a second internal region; and wherein inserting the femoral stem through the hip cone installed in the femur includes inserting the femoral stem through the hip cone installed in the femur so that: a first portion of the femoral stem extends within the second internal region defined by the hip cone; and a second portion of the femoral stem extends outside the hip cone and within the first internal region defined within the femur. In one or more embodiments, effecting immediate mechanical fixation among the femur, the hip cone, and the femoral stem includes: backfilling, with bone cement, the first internal region defined within the femur and the second internal region defined by the hip cone. In one or more embodiments, the first internal region defined within the femur defines interior surface(s) of the femur; wherein a first annular-type region is defined between the femoral stem and the interior surface(s) of the femur; wherein the first annular-type region is filled with the bone cement so that the second portion of the femoral stem, which extends outside the hip cone and within the first internal region defined within the femur, is surrounded by the bone cement; and wherein the surrounding of the second portion of the femoral stem by the bone cement effects, at least in part, the immediate mechanical fixation among the femur, the hip cone, and the femoral stem. In one or more embodiments, the second internal region defined by the hip cone defines interior surface(s) of the hip cone; wherein a second annular-type region is defined between the femoral stem and the interior surface(s) of the hip cone; wherein the second annular-type region is filled with the bone cement so that the first portion of the femoral stem, which extends within the second internal region of the hip cone, is surrounded by the bone cement; wherein the surrounding of the first portion of the femoral stem by the bone cement effects, at least in part, the immediate mechanical fixation among the femur, the hip cone, and the femoral stem; and wherein the bone cement unitizes the femoral stem to the hip cone, creating a united construct comprising the femoral stem and the hip cone. In one or more embodiments, the first internal region defined within the femur defines interior surface(s) of the femur; wherein a first annular-type region is defined between the femoral stem and the interior surface(s) of the femur; wherein the first annular-type region is filled with the bone cement so that the second portion of the femoral stem, which extends outside the hip cone and within the first internal region defined within the femur, is surrounded by the bone cement; wherein the second internal region defined by the hip cone defines interior surface(s) of the hip cone;

wherein a second annular-type region is defined between the femoral stem and the interior surface(s) of the hip cone; wherein the second annular-type region is filled with the bone cement so that the first portion of the femoral stem, which extends within the second internal region of the hip cone, is surrounded by the bone cement; wherein each of the surrounding of the second portion of the femoral stem by the bone cement, and the surrounding of the first portion of the femoral stem by the bone cement, effects, at least in part, the immediate mechanical fixation among the femur, the hip cone, and the femoral stem; and wherein the bone cement unitizes the femoral stem to the hip cone, creating a united construct comprising the femoral stem and the hip cone. In one or more embodiments, effecting biologic fixation between the femur and the hip cone includes: configuring the hip cone to promote biologic fixation so that, after the hip cone is installed in the femur, biologic fixation between femur and the hip cone is permitted. In one or more embodiments, configuring the hip cone to promote biologic fixation includes: (a) coating at least a portion of the hip cone with a porous coating; (b) forming at least a portion of the hip cone out of a porous material; or both (a) and (b).

A system or kit is described according to one or more embodiments of the present disclosure; in one or more embodiments, the system or kit includes: an acetabular cup; a femoral head adapted to engage the acetabular cup; a femoral stem adapted to be operably coupled to the femoral head and adapted to be installed in a femur; and a hip cone adapted to be installed in the femur, the hip cone defining an internal region through which the femoral stem is adapted to extend when the hip cone is installed in the femur and the femoral stem is installed in the femur; wherein the internal region defined by the hip cone defines interior surface(s) of the hip cone; wherein each of the femoral stem and the internal region of the hip cone is sized so that, when the hip cone is installed in the femur and the femoral stem is installed in the femur and extends through the internal region, an annular-type region is defined between the femoral stem and the interior surface(s) of the hip cone; and wherein the annular-type region is sized to permit bone cement to surround the femoral stem for mechanical fixation so that the bone cement unitizes the femoral stem to the hip cone, creating a united construct comprising the femoral stem and the hip cone. In one or more embodiments, the hip cone includes: a body defining the internal region through which the femoral stem is adapted to extend, the body including opposing first and second end portions; a first opening formed in the first end portion of the body and through which the femoral stem is adapted to extend, the first opening having a first shape; and a second opening formed in the second end portion of the body and through which the femoral stem is adapted to extend, the second opening having a second shape; wherein the second shape of the second opening is different from the first shape of the first opening. In one or more embodiments, the first shape of the first opening of the hip cone is a slot shape; and wherein the second shape of the second opening of the hip cone is a circular shape, an ovoid shape, an oblong shape, or an irregular shape. In one or more embodiments, the slot shape is a keyhole-slot shape. In one or more embodiments, the hip cone is configured to promote biologic fixation so that, after the hip cone is installed in the femur, biologic fixation between the femur and the hip cone is permitted. In one or more embodiments, the configuration of the hip cone to promote biologic fixation includes a porous coating on at least a portion of the hip cone. In one or more embodiments, the configuration of the hip cone to promote biologic fixation includes at least a portion of the hip cone formed out of a porous material. In one or more embodiments, the configuration of the hip cone to promote biologic fixation includes: a porous coating on at least a portion of the hip cone; and at least a portion of the hip cone formed out of a porous material. In one or more embodiments, the at least a portion of the hip cone on which the porous coating is on is also the at least a portion of the hip cone formed out of the porous material. In one or more embodiments, the hip cone includes: a body defining the internal region through which the femoral stem is adapted to extend, the body having an overall outside shape; wherein the interior region of the hip cone has a shape; and wherein the shape of the interior region corresponds to the overall outside shape of the body.

A hip cone, which is adapted to be installed in a femur for primary, conversion, or revision total hip arthroplasty, is described according to one or more embodiments of the present disclosure; in one or more embodiments, the hip cone includes: a body having an overall outside shape and including opposing first and second end portions, the body defining an internal region through which a femoral stem is adapted to extend, the internal region having a region shape; a first opening formed in the first end portion of the body and through which the femoral stem is adapted to extend, the first opening having a first shape; and a second opening formed in the second end portion of the body and through which the femoral stem is adapted to extend, the second opening having a second shape; wherein: (a) the second shape of the second opening is different from the first shape of the first opening; (b) the region shape of the interior region of the body corresponds to the overall outside shape of the body; or both (a) and (b). In one or more embodiments, the second shape of the second opening is different from the first shape of the first opening; wherein the first shape of the first opening is a slot shape; and wherein the second shape of the second opening of the hip cone is a circular shape, an ovoid shape, an oblong shape, or an irregular shape. In one or more embodiments, the slot shape is a keyhole-slot shape. In one or more embodiments the hip cone is configured to promote biologic fixation so that, after the hip cone is installed in the femur, biologic fixation between femur and the hip cone is permitted. In one or more embodiments, the configuration of the hip cone to promote biologic fixation includes a porous coating on at least a portion of the hip cone. In one or more embodiments, the configuration of the hip cone to promote biologic fixation includes at least a portion of the hip cone formed out of a porous material. In one or more embodiments, the configuration of the hip cone to promote biologic fixation includes: a porous coating on at least a portion of the hip cone; and at least a portion of the hip cone formed out of a porous material. In one or more embodiments, the at least a portion of the hip cone on which the porous coating is on is also the at least a portion of the hip cone formed out of the porous material.

An apparatus is described according to one or more embodiments of the present disclosure; in one or more embodiments, the apparatus includes: a non-transitory computer readable medium; and a plurality of instructions stored on the non-transitory computer readable medium and executable by one or more processors to produce a hip cone, which is adapted to be installed in a femur for primary, conversion, or revision total hip arthroplasty; in one or more embodiments, the hip cone is produced by three-dimensional printing; in one or more embodiments, the execution of the plurality of instructions controls a three-dimensional printer, which is operably coupled to the one or more processors, to produce the hip cone by three-dimensionally printing the hip cone; in one or more embodiments, the hip cone includes: a body having an overall outside shape and including opposing first and second end portions, the body defining an internal region through which a femoral stem is adapted to extend, the internal region having a region shape; a first opening formed in the first end portion of the body and through which the femoral stem is adapted to extend, the first opening having a first shape; and a second opening formed in the second end portion of the body and through which the femoral stem is adapted to extend, the second opening having a second shape; wherein: (a) the second shape of the second opening is different from the first shape of the first opening; (b) the region shape of the interior region of the body corresponds to the overall outside shape of the body; or both (a) and (b). In one or more embodiments, the second shape of the second opening is different from the first shape of the first opening; wherein the first shape of the first opening is a slot shape; and wherein the second shape of the second opening of the hip cone is a circular shape, an ovoid shape, an oblong shape, or an irregular shape. In one or more embodiments, the slot shape is a keyhole-slot shape. In one or more embodiments the hip cone is configured to promote biologic fixation so that, after the hip cone is installed in the femur, biologic fixation between femur and the hip cone is permitted. In one or more embodiments, the configuration of the hip cone to promote biologic fixation includes a porous coating on at least a portion of the hip cone. In one or more embodiments, the configuration of the hip cone to promote biologic fixation includes at least a portion of the hip cone formed out of a porous material. In one or more embodiments, the configuration of the hip cone to promote biologic fixation includes: a porous coating on at least a portion of the hip cone; and at least a portion of the hip cone formed out of a porous material. In one or more embodiments, the at least a portion of the hip cone on which the porous coating is on is also the at least a portion of the hip cone formed out of the porous material.

An apparatus is described according to one or more embodiments of the present disclosure; in one or more embodiments, the apparatus includes: a non-transitory computer readable medium; and a plurality of instructions stored on the non-transitory computer readable medium and executable by one or more processors to implement, carry out, or execute a method for complex primary, conversion, or revision total hip replacement; in one or more embodiments, the method includes: installing a hip cone within a first internal region defined within a femur, the hip cone defining a second internal region; backfilling, with bone cement, the first internal region defined within the femur and the second internal region defined by the hip cone; and inserting a femoral stem through the second internal region defined by the hip cone so that: a first portion of the femoral stem extends within the second internal region defined by the hip cone; and a second portion of the femoral stem extends outside the hip cone and within the first internal region defined within the femur. In one or more embodiments, the first internal region defined within the femur defines interior surface(s) of the femur; wherein a first annular-type region is defined between the femoral stem and the interior surface(s) of the femur; and wherein the first annular-type region is filled with the bone cement so that the second portion of the femoral stem, which extends outside the hip cone and within the first internal region defined within the femur, is surrounded by the bone cement. In one or more embodiments, the second internal region defined by the hip cone defines interior surface(s) of the hip cone; wherein a second annular-type region is defined between the femoral stem and the interior surface(s) of the hip cone; wherein the second annular-type region is filled with the bone cement so that the first portion of the femoral stem, which extends within the second internal region of the hip cone, is surrounded by the bone cement; and wherein the bone cement unitizes the femoral stem to the hip cone, creating a united construct comprising the femoral stem and the hip cone. In one or more embodiments, the first internal region defined within the femur defines interior surface(s) of the femur; wherein a first annular-type region is defined between the femoral stem and the interior surface(s) of the femur; wherein the first annular-type region is filled with the bone cement so that the second portion of the femoral stem, which extends outside the hip cone and within the first internal region defined within the femur, is surrounded by the bone cement; wherein the second internal region defined by the hip cone defines interior surface(s) of the hip cone; wherein a second annular-type region is defined between the femoral stem and the interior surface(s) of the hip cone; and wherein the second annular-type region is filled with the bone cement so that the first portion of the femoral stem, which extends within the second internal region of the hip cone, is surrounded by the bone cement. In one or more embodiments, the method includes removing material from the femur to provide the first internal region defined within the femur; and providing internal seating surface(s) of the femur, which internal seating surface(s) are configured to engage the hip cone; wherein installing the hip cone within the first internal region defined within a femur includes installing the hip cone against the internal seating surface(s) of the femur. In one or more embodiments, the method includes setting or positioning anteversion of the femoral stem: before inserting the femoral stem through the second internal region; during inserting the femoral stem through the second internal region; after inserting the femoral stem through the second internal region; or any combination thereof. In one or more embodiments, the femoral stem is inserted through the second internal region defined by the hip cone: before backfilling, with the bone cement, the first internal region defined within the femur and the second internal region defined by the hip cone; during backfilling, with the bone cement, the first internal region defined within the femur and the second internal region defined by the hip cone; after backfilling, with the bone cement, the first internal region defined within the femur and the second internal region defined by the hip cone; or any combination thereof.

An apparatus is described according to one or more embodiments of the present disclosure; in one or more embodiments, the apparatus includes: a non-transitory computer readable medium; and a plurality of instructions stored on the non-transitory computer readable medium and executable by one or more processors to implement, carry out, or execute a method for complex primary, conversion, or revision total hip replacement; in one or more embodiments, the method includes: removing an original hip implant from a femur; installing a hip cone in the femur; inserting a femoral stem through the hip cone installed in the femur; effecting immediate mechanical fixation among the femur, the hip cone, and the femoral stem; and effecting biologic fixation between the femur and the hip cone. In one or more embodiments, the mechanical fixation unitizes the femoral stem to the hip cone, creating a united construct comprising the femoral stem and the hip cone. In one or more embodiments, a first internal region is defined within the femur; wherein installing the hip cone in the femur includes installing the hip cone within the first internal region defined within the femur; wherein the hip cone defines a second internal region; and wherein inserting the femoral stem through the hip cone installed in the femur includes inserting the femoral stem through the hip cone installed in the femur so that: a first portion of the femoral stem extends within the second internal region defined by the hip cone; and a second portion of the femoral stem extends outside the hip cone and within the first internal region defined within the femur. In one or more embodiments, effecting immediate mechanical fixation among the femur, the hip cone, and the femoral stem includes: backfilling, with bone cement, the first internal region defined within the femur and the second internal region defined by the hip cone. In one or more embodiments, the first internal region defined within the femur defines interior surface(s) of the femur; wherein a first annular-type region is defined between the femoral stem and the interior surface(s) of the femur; wherein the first annular-type region is filled with the bone cement so that the second portion of the femoral stem, which extends outside the hip cone and within the first internal region defined within the femur, is surrounded by the bone cement; and wherein the surrounding of the second portion of the femoral stem by the bone cement effects, at least in part, the immediate mechanical fixation among the femur, the hip cone, and the femoral stem. In one or more embodiments, the second internal region defined by the hip cone defines interior surface(s) of the hip cone; wherein a second annular-type region is defined between the femoral stem and the interior surface(s) of the hip cone; wherein the second annular-type region is filled with the bone cement so that the first portion of the femoral stem, which extends within the second internal region of the hip cone, is surrounded by the bone cement; wherein the surrounding of the first portion of the femoral stem by the bone cement effects, at least in part, the immediate mechanical fixation among the femur, the hip cone, and the femoral stem; and wherein the bone cement unitizes the femoral stem to the hip cone, creating a united construct comprising the femoral stem and the hip cone. In one or more embodiments, the first internal region defined within the femur defines interior surface(s) of the femur; wherein a first annular-type region is defined between the femoral stem and the interior surface(s) of the femur; wherein the first annular-type region is filled with the bone cement so that the second portion of the femoral stem, which extends outside the hip cone and within the first internal region defined within the femur, is surrounded by the bone cement; wherein the second internal region defined by the hip cone defines interior surface(s) of the hip cone; wherein a second annular-type region is defined between the femoral stem and the interior surface(s) of the hip cone; wherein the second annular-type region is filled with the bone cement so that the first portion of the femoral stem, which extends within the second internal region of the hip cone, is surrounded by the bone cement; wherein each of the surrounding of the second portion of the femoral stem by the bone cement, and the surrounding of the first portion of the femoral stem by the bone cement, effects, at least in part, the immediate mechanical fixation among the femur, the hip cone, and the femoral stem; and wherein the bone cement unitizes the femoral stem to the hip cone, creating a united construct comprising the femoral stem and the hip cone. In one or more embodiments, effecting biologic fixation between the femur and the hip cone includes: configuring the hip cone to promote biologic fixation so that, after the hip cone is installed in the femur, biologic fixation between femur and the hip cone is permitted. In one or more embodiments, configuring the hip cone to promote biologic fixation includes: (a) coating at least a portion of the hip cone with a porous coating; (b) forming at least a portion of the hip cone out of a porous material; or both (a) and (b).

It is further understood that variations may be made in the foregoing without departing from the scope of the disclosure.

In one or more embodiments, the elements and teachings of the various embodiments disclosed herein may be combined in whole or in part in some or all of said embodiment(s). In addition, one or more of the elements and teachings of the various embodiments disclosed herein may be omitted, at least in part, or combined, at least in part, with one or more of the other elements and teachings of said embodiment(s).

Any spatial references such as, for example, "upper," "lower," "above," "below," "between," "bottom," "vertical," "horizontal," "angular," "upwards," "downwards," "side-to-side," "left-to-right," "left," "right," "right-to-left," "top-to-bottom," "bottom-to-top," "top," "bottom," "bottom-up," "top-down," etc., are for the purpose of illustration only and do not limit the specific orientation or location of the structure described above.

In one or more embodiments, while different steps, processes, and procedures are described as appearing as distinct acts, one or more of the steps, one or more of the processes, or one or more of the procedures may also be performed in different orders, simultaneously or sequentially. In one or more embodiments, the steps, processes or procedures may be merged into one or more steps, processes or procedures. In one or more embodiments, one or more of the operational steps in each embodiment may be omitted. Moreover, in some instances, some features of the present disclosure may be employed without a corresponding use of the other features.

Although various embodiments have been disclosed in detail above, the embodiments disclosed are examples only and are not limiting, and those skilled in the art will readily appreciate that many other modifications, changes, and substitutions are possible in the embodiments without materially departing from the novel teachings and advantages of the present disclosure. Accordingly, all such modifications, changes, and substitutions are intended to be included within the scope of this disclosure as defined in the following claims. In the claims, means-plus-function clauses are intended to cover the structures described herein as performing the recited function and not only structural equivalents, but also equivalent structures. Moreover, it is the express intention of the applicant not to invoke 35 U.S.C. § 112 (f) for any limitations of any of the claims herein, except for those in which the claim expressly uses the word "means" together with an associated function.

What is claimed is:

1. A hip cone adapted to be installed in a femur for primary, conversion, or revision total hip arthroplasty, the hip cone comprising:
   a body having an overall outside shape and comprising opposing first and second ends, the body defining an internal region through which a femoral stem is adapted to extend, the internal region having a region shape;
   a first opening formed in the first end of the body and through which the femoral stem is adapted to extend, the first opening having a first shape;

and
a second opening formed in the second end of the body and through which the femoral stem is adapted to extend, the second opening having a second shape;
wherein the second shape of the second opening is different from the first shape of the first opening;
wherein the region shape of the interior region of the body corresponds to the overall outside shape of the body:
wherein the body defines one or more external surfaces, the one or more external surfaces defining an external shape in a cross-sectional plane that is: positioned between the first and second ends; and perpendicular to a direction in which the femoral stem is adapted to extend through the internal region;
wherein the external shape of the body in the cross-sectional plane is configured to be the same as an internal shape defined by internal seating surface(s) of the femur so that, when the hip cone is installed in the femur, the external shape of the body is coplanar with, and installed against, the internal shape defined by the internal seating surface(s) of the femur;
wherein the first shape of the first opening is a slot shape;
wherein the second shape of the second opening of the hip cone is a circular shape, an ovoid shape, an oblong shape, or an irregular shape;
wherein the hip cone is configured to promote biologic fixation so that, after the hip cone is installed in the femur, biologic fixation between the femur and the hip cone is permitted;
wherein the configuration of the hip cone to promote biologic fixation comprises:
a porous coating on at least a portion of the hip cone; and/or
at least a portion of the hip cone formed out of a porous material;
wherein the body of the hip cone comprises a main portion and a spout portion adjoined thereto;
wherein the main portion and the spout portion of the body together define the internal region through which the femoral stem is adapted to extend;
wherein the main portion of the body comprises:
a first main end portion;
a second main end portion opposite the first main end portion and comprising an end that is the same as the second end of the body of the hip cone and thus the second opening, which has the circular shape, the ovoid shape, the oblong shape, or the irregular shape, is formed in the end of the second main end portion of the main portion of the body of the hip cone; and
an intermediate sleeve portion extending between the first main end portion and the second main end portion;
wherein the main portion of the body defines a first portion of the internal region through which the femoral stem is adapted to extend;
wherein the spout portion of the body comprises:
a first spout end portion;
a second spout end portion; and
an angled portion extending between the first spout end portion and the second spout end portion;
wherein the spout portion of the body defines a second portion of the internal region through which the femoral stem is adapted to extend;
wherein the main portion and the spout portion are contiguous so that together they define the overall outside shape of the body;
wherein the first and second portions of the internal region, which are defined by the main and spout portions of the body, respectively, are contiguous so that together they define the region shape of the interior region of the body, which region shape corresponds to the overall outside shape of the body;
wherein the first main end portion and the first spout end portion are contiguous so that together they form the first end of the body of the hip cone and thus the first opening, which has the slot shape, is formed in the contiguous first main end portion and first spout end portion;
wherein the second spout end portion terminates at the main portion of the body so that the second spout end portion is spaced from the end of the second main end portion in a direction in which the femoral stem is adapted to extend through the second opening of the body of the hip cone, and thus a spacing is defined between:
the termination of the second spout end portion at the main portion of the body, and
the second end of the body of the hip cone,
in the direction in which the femoral stem is adapted to extend through the second opening of the body of the hip cone;
wherein the angled portion of the spout portion of the body is angled with respect to the main portion of the body so that respective portions of the angled portion and the main portion define an obtuse angle of the body of the hip cone; and
wherein the obtuse angle of the body of the hip cone, which is defined by the respective portions of the angled portion and the main portion, is adapted to accommodate:
an obtuse angle of the femur defined by respective portions of the internal seating surface(s) of the femur so that, when the hip cone is installed in the femur, the body is installed against the respective portions of the internal seating surface(s) of the femur that define the obtuse angle of the femur; and
an obtuse angle defined by the femoral stem so that the femoral stem is permitted to extend through: the first opening formed in the first end of the body of the hip cone; the internal region defined by the body of the hip cone; and the second opening formed in the second end of the body of the hip cone, which second end of the body of the hip cone is the same as the end of the second main end portion.

2. The hip cone of claim 1,
wherein the configuration of the hip cone to promote biologic fixation comprises:
the porous coating on the at least a portion of the hip cone; and
the at least a portion of the hip cone formed out of the porous material; and
wherein the at least a portion of the hip cone on which the porous coating is on is also the at least a portion of the hip cone formed out of the porous material.

3. The hip cone of claim 1, wherein the external shape of the body in the cross-sectional plane is a circular shape.

4. The hip cone of claim 1, wherein the configuration of the hip cone to promote biologic fixation comprises the porous coating on the at least a portion of the hip cone.

5. The hip cone of claim 1, wherein the configuration of the hip cone to promote biologic fixation comprises the at least a portion of the hip cone formed out of the porous material.

6. The hip cone of claim 1, wherein the configuration of the hip cone to promote biologic fixation comprises:
the porous coating on the at least a portion of the hip cone; and
the at least a portion of the hip cone formed out of the porous material.

7. The hip cone of claim 1, wherein the slot shape is a keyhole-slot shape.

8. A system, comprising:
an acetabular cup;
a femoral head adapted to engage the acetabular cup;
a femoral stem adapted to be operably coupled to the femoral head and adapted to be installed in a femur; and
a hip cone adapted to be installed in the femur, the hip cone defining an internal region through which the femoral stem is adapted to extend when the hip cone is installed in the femur and the femoral stem is installed in the femur;
wherein the internal region defined by the hip cone defines interior surface(s) of the hip cone;
wherein each of the femoral stem and the internal region of the hip cone is sized so that, when the hip cone is installed in the femur and the femoral stem is installed in the femur and extends through the internal region, an annular-type region is defined between the femoral stem and the interior surface(s) of the hip cone; and
wherein the annular-type region is sized to permit bone cement to surround the femoral stem for mechanical fixation so that the bone cement unitizes the femoral stem to the hip cone, creating a united construct comprising the femoral stem and the hip cone;
wherein the hip cone comprises:
a body defining the internal region through which the femoral stem is adapted to extend, the body comprising opposing first and second ends;
a first opening formed in the first end of the body and through which the femoral stem is adapted to extend, the first opening having a first shape; and
a second opening formed in the second end of the body and through which the femoral stem is adapted to extend, the second opening having a second shape;
wherein the body defines one or more external surfaces, the one or more external surfaces defining an external shape in a cross-sectional plane that is: positioned between the opposing first and second ends; and perpendicular to a direction in which the femoral stem is adapted to extend through the internal region;
wherein the external shape of the body in the cross-sectional plane is configured to be the same as an internal shape defined by internal seating surface(s) of the femur so that, when the hip cone is installed in the femur, the external shape of the body is coplanar with, and installed against, the internal shape defined by the internal seating surface(s) of the femur;
wherein the second shape of the second opening is different from the first shape of the first opening;
wherein the body has an overall outside shape;
wherein the internal region of the hip cone has a region shape;
wherein the region shape of the interior internal region corresponds to the overall outside shape of the body;
wherein the first shape of the first opening of the hip cone is a slot shape;
wherein the second shape of the second opening of the hip cone is a circular shape, an ovoid shape, an oblong shape, or an irregular shape;
wherein the hip cone is configured to promote biologic fixation so that, after the hip cone is installed in the femur, biologic fixation between the femur and the hip cone is permitted;
wherein the configuration of the hip cone to promote biologic fixation comprises:
a porous coating on at least a portion of the hip cone; and/or
at least a portion of the hip cone formed out of a porous material;
wherein the body of the hip cone comprises a main portion and a spout portion adjoined thereto;
wherein the main portion and the spout portion of the body together define the internal region through which the femoral stem is adapted to extend;
wherein the main portion of the body comprises:
a first main end portion;
a second main end portion opposite the first main end portion and comprising an end that is the same as the second end of the body of the hip cone and thus the second opening, which has the circular shape, the ovoid shape, the oblong shape, or the irregular shape, is formed in the end of the second main end portion of the main portion of the body of the hip cone; and
an intermediate sleeve portion extending between the first main end portion and the second main end portion;
wherein the main portion of the body defines a first portion of the internal region through which the femoral stem is adapted to extend;
wherein the spout portion of the body comprises:
a first spout end portion;
a second spout end portion; and
an angled portion extending between the first spout end portion and the second spout end portion;
wherein the spout portion of the body defines a second portion of the internal region through which the femoral stem is adapted to extend;
wherein the main portion and the spout portion are contiguous so that together they define the overall outside shape of the body;
wherein the first and second portions of the internal region, which are defined by the main and spout portions of the body, respectively, are contiguous so that together they define the region shape of the interior region of the body, which region shape corresponds to the overall outside shape of the body;
wherein the first main end portion and the first spout end portion are contiguous so that together they form the first end of the body of the hip cone and thus the first opening, which has the slot shape, is formed in the contiguous first main end portion and first spout end portion;
wherein the second spout end portion terminates at the main portion of the body so that the second spout end portion is spaced from the end of the second main end portion in a direction in which the femoral stem is adapted to extend through the second opening of the body of the hip cone, and thus a spacing is defined between:
the termination of the second spout end portion at the main portion of the body, and
the second end of the body of the hip cone,
in the direction in which the femoral stem is adapted to extend through the second opening of the body of the hip cone;

wherein the angled portion of the spout portion of the body is angled with respect to the main portion of the body so that respective portions of the angled portion and the main portion define an obtuse angle of the body of the hip cone; and wherein the obtuse angle of the body of the hip cone, which is defined by the respective portions of the angled portion and the main portion, is adapted to accommodate:
- an obtuse angle of the femur defined by respective portions of the internal seating surface(s) of the femur so that, when the hip cone is installed in the femur, the body is installed against the respective portions of the internal seating surface(s) of the femur that define the obtuse angle of the femur; and
- an obtuse angle defined by the femoral stem so that the femoral stem is permitted to extend through: the first opening formed in the first end of the body of the hip cone; the internal region defined by the body of the hip cone; and the second opening formed in the second end of the body of the hip cone, which second end of the body of the hip cone is the same as the end of the second main end portion.

9. The system of claim 8, wherein the external shape of the body in the cross-sectional plane is a circular shape.

10. The system of claim 8, wherein the configuration of the hip cone to promote biologic fixation comprises the porous coating on the at least a portion of the hip cone.

11. The system of claim 8, wherein the configuration of the hip cone to promote biologic fixation comprises the at least a portion of the hip cone formed out of the porous material.

12. The system of claim 8, wherein the configuration of the hip cone to promote biologic fixation comprises:
- the porous coating on the at least a portion of the hip cone; and
- the at least a portion of the hip cone formed out of the porous material.

13. The system of claim 12, wherein the at least a portion of the hip cone on which the porous coating is on is also the at least a portion of the hip cone formed out of the porous material.

14. The system of claim 8, wherein the slot shape is a keyhole-slot shape.

15. A method, comprising:
- installing a hip cone within a first internal region defined within a femur so that the hip cone engages internal seating surface(s) of the femur, the hip cone defining a second internal region;
- backfilling, with bone cement, the first internal region defined within the femur and the second internal region defined by the hip cone; and
- inserting a femoral stem through the second internal region defined by the hip cone so that:
  - a first portion of the femoral stem extends within the second internal region defined by the hip cone; and
  - a second portion of the femoral stem extends outside the hip cone and within the first internal region defined within the femur;

wherein the hip cone is installed within the first internal region and engaged with the internal seating surface(s) of the femur before the first internal region is backfilled with the bone cement, and thus the first internal region is backfilled with the bone cement after the hip cone is installed within the first internal region and engaged with the internal seating surface(s) of the femur;

wherein the hip cone is installed within the first internal region and engaged with the internal seating surface(s) of the femur before the femoral stem is inserted through the second internal region so that the first portion of the femoral stem extends within the second internal region and the second portion of the femoral stem extends outside the hip cone and within the first internal region, and thus the first and second portions of the femoral stem extend within the second internal region, and outside the hip cone and within the first internal region, respectively, after the hip cone is installed within the first internal region and engaged with the internal seating surface(s) of the femur;

wherein the hip cone comprises:
- a body defining the second internal region through which the femoral stem is adapted to extend, the body comprising opposing first and second ends and having an overall outside shape, the second internal region having a region shape;
- a first opening formed in the first end portion of the body and through which the femoral stem is adapted to extend, the first opening having a first shape; and
- a second opening formed in the second end of the body and through which the femoral stem is adapted to extend, the second opening having a second shape;

wherein:
- the second shape of the second opening is different from the first shape of the first opening; and
- the region shape of the second internal region of the body corresponds to the overall outside shape of the body;

wherein the body defines one or more external surfaces, the one or more external surfaces defining an external shape in a cross-sectional plane that is: positioned between the opposing first and second ends; and perpendicular to a direction in which the femoral stem is adapted to extend through the second internal region;

wherein the external shape of the body in the cross-sectional plane is configured to be the same as an internal shape defined by the internal seating surface(s) of the femur so that, when the hip cone is installed in the femur, the external shape of the body is coplanar with, and installed against, the internal shape defined by the internal seating surface(s) of the femur;

wherein the first shape of the first opening is a slot shape;

wherein the second shape of the second opening of the hip cone is a circular shape, an ovoid shape, an oblong shape, or an irregular shape;

wherein the hip cone is configured to promote biologic fixation so that, after the hip cone is installed in the femur, biologic fixation between the femur and the hip cone is permitted;

wherein the configuration of the hip cone to promote biologic fixation comprises:
- a porous coating on at least a portion of the hip cone; and/or
- at least a portion of the hip cone formed out of a porous material;

wherein the body of the hip cone comprises a main portion and a spout portion adjoined thereto;

wherein the main portion and the spout portion of the body together define the second internal region through which the femoral stem is adapted to extend;

wherein the main portion of the body comprises:
  a first main end portion;
  a second main end portion opposite the first main end portion and comprising an end that is the same as the second end of the body of the hip cone and thus the second opening, which has the circular shape, the ovoid shape, the oblong shape, or the irregular shape, is formed in the end of the second main end portion of the main portion of the body of the hip cone; and
  an intermediate sleeve portion extending between the first main end portion and the second main end portion;
wherein the main portion of the body defines a first portion of the second internal region through which the femoral stem is adapted to extend;
wherein the spout portion of the body comprises:
  a first spout end portion;
  a second spout end portion; and
  an angled portion extending between the first spout end portion and the second spout end portion;
wherein the spout portion of the body defines a second portion of the second internal region through which the femoral stem is adapted to extend;
wherein the main portion and the spout portion are contiguous so that together they define the overall outside shape of the body;
wherein the first and second portions of the second internal region, which are defined by the main and spout portions of the body, respectively, are contiguous so that together they define the region shape of the second internal region of the body, which region shape corresponds to the overall outside shape of the body;
wherein the first main end portion and the first spout end portion are contiguous so that together they form the first end of the body of the hip cone and thus the first opening, which has the slot shape, is formed in the contiguous first main end portion and first spout end portion;
wherein the second spout end portion terminates at the main portion of the body so that the second spout end portion is spaced from the end of the second main end portion in a direction in which the femoral stem is adapted to extend through the second opening of the body of the hip cone, and thus a spacing is defined between:
  the termination of the second spout end portion at the main portion of the body, and
  the second end of the body of the hip cone,
  in the direction in which the femoral stem is adapted to extend through the second opening of the body of the hip cone;
wherein the angled portion of the spout portion of the body is angled with respect to the main portion of the body so that respective portions of the angled portion and the main portion define an obtuse angle of the body of the hip cone; and
wherein the obtuse angle of the body of the hip cone, which is defined by the respective portions of the angled portion and the main portion, is adapted to accommodate:
  an obtuse angle of the femur defined by respective portions of the internal seating surface(s) of the femur so that, when the hip cone is installed in the femur, the body is installed against the respective portions of the internal seating surface(s) of the femur that define the obtuse angle of the femur; and
  an obtuse angle defined by the femoral stem so that the femoral stem is permitted to extend through: the first opening formed in the first end of the body of the hip cone; the second internal region defined by the body of the hip cone; and the second opening formed in the second end of the body of the hip cone, which second end of the body of the hip cone is the same as the end of the second main end portion.

16. The method of claim 15,
wherein the first internal region defined within the femur defines interior surface(s) of the femur;
wherein a first annular-type region is defined between the femoral stem and the interior surface(s) of the femur; and
wherein the first annular-type region is filled with the bone cement so that the second portion of the femoral stem, which extends outside the hip cone and within the first internal region defined within the femur, is surrounded by the bone cement.

17. The method of claim 16,
wherein the second internal region defined by the hip cone defines interior surface(s) of the hip cone;
wherein a second annular-type region is defined between the femoral stem and the interior surface(s) of the hip cone; and
wherein the second annular-type region is filled with the bone cement so that the first portion of the femoral stem, which extends within the second internal region of the hip cone, is surrounded by the bone cement.

18. The method of claim 15, wherein the external shape of the body in the cross-sectional plane is a circular shape.

19. The method of claim 15, wherein the configuration of the hip cone to promote biologic fixation comprises the porous coating on the at least a portion of the hip cone.

20. The method of claim 15, wherein the configuration of the hip cone to promote biologic fixation comprises the at least a portion of the hip cone formed out of the porous material.

21. The method of claim 15, wherein the configuration of the hip cone to promote biologic fixation comprises:
  the porous coating on the at least a portion of the hip cone; and
  the at least a portion of the hip cone formed out of the porous material.

22. The method of claim 21, wherein the at least a portion of the hip cone on which the porous coating is on is also the at least a portion of the hip cone formed out of the porous material.

23. The method of claim 15, wherein the slot shape is a keyhole-slot shape.

24. A method, comprising:
removing an original hip implant from a femur;
installing a hip cone in the femur so that the hip cone engages internal seating surface(s) of the femur;
inserting a femoral stem through the hip cone installed in the femur;
effecting immediate mechanical fixation among the femur, the hip cone, and the femoral stem; and
effecting biologic fixation between the femur and the hip cone;
wherein the hip cone is installed in the femur and engaged with the internal seating surface(s) of the femur before the femoral stem is inserted through the hip cone, and thus the femoral stem is inserted through the hip cone after the hip cone is installed in the femur and engaged with the internal seating surface(s) of the femur;
wherein the hip cone comprises:

a body defining a first internal region through which the femoral stem is adapted to extend, the body having an overall outside shape and comprising opposing first and second ends, the first internal region having a region shape;
a first opening formed in the first end of the body and through which the femoral stem is adapted to extend, the first opening having a first shape; and
a second opening formed in the second end of the body and through which the femoral stem is adapted to extend, the second opening having a second shape;
wherein:
the second shape of the second opening is different from the first shape of the first opening; and
the region shape of the first internal region of the body corresponds to the overall outside shape of the body;
wherein the body defines one or more external surfaces, the one or more external surfaces defining an external shape in a cross-sectional plane that is: positioned between the opposing first and second ends;
and perpendicular to a direction in which the femoral stem is adapted to extend through the first internal region;
wherein the external shape of the body in the cross-sectional plane is configured to be the same as an internal shape defined by the internal seating surface(s) of the femur so that, when the hip cone is installed in the femur, the external shape of the body is coplanar with, and installed against, the internal shape defined by the internal seating surface(s) of the femur;
wherein the first shape of the first opening is a slot shape;
wherein the second shape of the second opening of the hip cone is a circular shape, an ovoid shape, an oblong shape, or an irregular shape;
wherein the hip cone is configured to promote biologic fixation so that, after the hip cone is installed in the femur, biologic fixation between the femur and the hip cone is permitted;
wherein the configuration of the hip cone to promote biologic fixation comprises:
a porous coating on at least a portion of the hip cone; and/or
at least a portion of the hip cone formed out of a porous material;
wherein the body of the hip cone comprises a main portion and a spout portion adjoined thereto;
wherein the main portion and the spout portion of the body together define the first internal region through which the femoral stem is adapted to extend;
wherein the main portion of the body comprises:
a first main end portion;
a second main end portion opposite the first main end portion and comprising an end that is the same as the second end of the body of the hip cone and thus the second opening, which has the circular shape, the ovoid shape, the oblong shape, or the irregular shape, is formed in the end of the second main end portion of the main portion of the body of the hip cone; and
an intermediate sleeve portion extending between the first main end portion and the second main end portion;
wherein the main portion of the body defines a first portion of the first internal region through which the femoral stem is adapted to extend;
wherein the spout portion of the body comprises:
a first spout end portion;
a second spout end portion; and
an angled portion extending between the first spout end portion and the second spout end portion;
wherein the spout portion of the body defines a second portion of the first internal region through which the femoral stem is adapted to extend;
wherein the main portion and the spout portion are contiguous so that together they define the overall outside shape of the body;
wherein the first and second portions of the first internal region, which are defined by the main and spout portions of the body, respectively, are contiguous so that together they define the region shape of the first internal region of the body, which region shape corresponds to the overall outside shape of the body;
wherein the first main end portion and the first spout end portion are contiguous so that together they form the first end of the body of the hip cone and thus the first opening, which has the slot shape, is formed in the contiguous first main end portion and first spout end portion;
wherein the second spout end portion terminates at the main portion of the body so that the second spout end portion is spaced from the end of the second main end portion in a direction in which the femoral stem is adapted to extend through the second opening of the body of the hip cone, and thus a spacing is defined between:
the termination of the second spout end portion at the main portion of the body, and
the second end of the body of the hip cone,
in the direction in which the femoral stem is adapted to extend through the second opening of the body of the hip cone;
wherein the angled portion of the spout portion of the body is angled with respect to the main portion of the body so that respective portions of the angled portion and the main portion define an obtuse angle of the body of the hip cone; and
wherein the obtuse angle of the body of the hip cone, which is defined by the respective portions of the angled portion and the main portion, is adapted to accommodate:
an obtuse angle of the femur defined by respective portions of the internal seating surface(s) of the femur so that, when the hip cone is installed in the femur, the body is installed against the respective portions of the internal seating surface(s) of the femur that define the obtuse angle of the femur; and
an obtuse angle defined by the femoral stem so that the femoral stem is permitted to extend through: the first opening formed in the first end of the body of the hip cone; the first internal region defined by the body of the hip cone; and the second opening formed in the second end of the body of the hip cone, which second end of the body of the hip cone is the same as the end of the second main end portion.

25. The method of claim 24, wherein the mechanical fixation unitizes the femoral stem to the hip cone, creating a united construct comprising the femoral stem and the hip cone.

26. The method of claim 24,
wherein a second internal region is defined within the femur;

wherein installing the hip cone in the femur comprises installing the hip cone within the second internal region defined within the femur; and
wherein inserting the femoral stem through the hip cone installed in the femur comprises inserting the femoral stem through the hip cone installed in the femur so that:
   a first portion of the femoral stem extends within the first internal region defined by the hip cone; and
   a second portion of the femoral stem extends outside the hip cone and within the second internal region defined within the femur.

27. The method of claim 26, wherein effecting immediate mechanical fixation among the femur, the hip cone, and the femoral stem comprises:
backfilling, with bone cement, the second internal region defined within the femur and the first internal region defined by the hip cone.

28. The method of claim 27,
wherein the second internal region defined within the femur defines interior surface(s) of the femur;
wherein a first annular-type region is defined between the femoral stem and the interior surface(s) of the femur;
wherein the first annular-type region is filled with the bone cement so that the second portion of the femoral stem, which extends outside the hip cone and within the second internal region defined within the femur, is surrounded by the bone cement; and
wherein the surrounding of the second portion of the femoral stem by the bone cement effects, at least in part, the immediate mechanical fixation among the femur, the hip cone, and the femoral stem.

29. The method of claim 28,
wherein the first internal region defined by the hip cone defines interior surface(s) of the hip cone;
wherein a second annular-type region is defined between the femoral stem and the interior surface(s) of the hip cone;
wherein the second annular-type region is filled with the bone cement so that the first portion of the femoral stem, which extends within the first internal region of the hip cone, is surrounded by the bone cement;
wherein the surrounding of the first portion of the femoral stem by the bone cement effects, at least in part, the immediate mechanical fixation among the femur, the hip cone, and the femoral stem; and
wherein the bone cement unitizes the femoral stem to the hip cone, creating a united construct comprising the femoral stem and the hip cone.

30. The method of claim 24, wherein the configuration of the hip cone to promote biologic fixation comprises the porous coating on the at least a portion of the hip cone.

31. The method of claim 24, wherein the configuration of the hip cone to promote biologic fixation comprises the at least a portion of the hip cone formed out of the porous material.

32. The method of claim 24, wherein the configuration of the hip cone to promote biologic fixation comprises:
   the porous coating on the at least a portion of the hip cone; and
   the at least a portion of the hip cone formed out of the porous material.

33. The method of claim 32, wherein the at least a portion of the hip cone on which the porous coating is on is also the at least a portion of the hip cone formed out of the porous material.

34. The method of claim 24, wherein the slot shape is a keyhole-slot shape.

* * * * *

UNITED STATES PATENT AND TRADEMARK OFFICE
CERTIFICATE OF CORRECTION

| | | |
|---|---|---|
| PATENT NO. | : 12,458,501 B1 | Page 1 of 1 |
| APPLICATION NO. | : 19/086299 | |
| DATED | : November 4, 2025 | |
| INVENTOR(S) | : Brian P. Gladnick and Alexander Sah | |

It is certified that error appears in the above-identified patent and that said Letters Patent is hereby corrected as shown below:

In the Claims

Claim 8, Column 25, Line 61, delete "interior" after -- of the --

Claim 15, Column 28, Line 21, delete "portion" after -- first end --

Signed and Sealed this
Sixteenth Day of December, 2025

John A. Squires
*Director of the United States Patent and Trademark Office*